United States Patent
Lin et al.

(10) Patent No.: US 10,820,353 B2
(45) Date of Patent: Oct. 27, 2020

(54) SYSTEM AND METHOD FOR SOUNDING REFERENCE SIGNAL TRANSMISSION

(71) Applicants: Yicheng Lin, Ottawa (CA); Keyvan Zarifi, Ottawa (CA); Mohammadhadi Baligh, Ottawa (CA)

(72) Inventors: Yicheng Lin, Ottawa (CA); Keyvan Zarifi, Ottawa (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/100,125

(22) Filed: Aug. 9, 2018

(65) Prior Publication Data
US 2019/0053287 A1 Feb. 14, 2019

Related U.S. Application Data

(60) Provisional application No. 62/543,930, filed on Aug. 10, 2017.

(51) Int. Cl.
*H04W 40/00* (2009.01)
*H04W 74/08* (2009.01)
*H04J 13/14* (2011.01)
*H04L 5/00* (2006.01)
*H04J 13/00* (2011.01)

(52) U.S. Cl.
CPC ..... *H04W 74/0833* (2013.01); *H04J 13/0062* (2013.01); *H04J 13/14* (2013.01); *H04L 5/0051* (2013.01); *H04J 2211/005* (2013.01)

(58) Field of Classification Search
CPC ............. H04W 74/0833; H04J 13/0062; H04J 2211/005

USPC .......................................................... 455/447
See application file for complete search history.

(56) References Cited

U.S. PATENT DOCUMENTS

| 9,118,531 | B2 * | 8/2015 | Lee ......................... H04J 13/14 |
| 2012/0213190 | A1 * | 8/2012 | Yoon ....................... H04L 5/001 |
| | | | 370/329 |
| 2014/0140301 | A1 | 5/2014 | Hao et al. |

(Continued)

FOREIGN PATENT DOCUMENTS

CN 105245320 A 1/2016

OTHER PUBLICATIONS

3rd Generation Partnership Project; Technical Specification Group Radio Access Network; NR; Multiplexing and channel coding (Release 15); 3GPP TS 38.212 V15.0.0 (Dec. 2017).

(Continued)

*Primary Examiner* — Huy C Ho

(57) ABSTRACT

Systems and methods are provided for transmit signalling to configure a UE with a UE specific root to use in generating a Zhadoff Chu (ZC) sequence for reference signal transmission. With conventional LTE, a cell specific root is used within each cell. There is a need for a more flexible association between roots and UEs that, for example, allows for multiple roots to be associated with a cell. The provided approach may help with maintaining re-use distance as networks become denser. The method provided in this embodiment improves the capabilities of automatic driving and ADAS of electric vehicles. The method can be applied to vehicle networking, such as V2X, LTE-V, V2X, etc.

52 Claims, 8 Drawing Sheets

(56) References Cited

U.S. PATENT DOCUMENTS

2017/0317816 A1* 11/2017 Lei .................... H04L 7/041

OTHER PUBLICATIONS

3rd Generation Partnership Project; Technical Specification Group Radio Access Network; NR; Physical layer procedures for control (Release 15); 3GPP TS 38.213 V15.0.0 (Dec. 2017).
"RAN1 Chairman's Notes", 3GPP TSG RAN WG1 Meeting #90,Prague, Czech Republic, Aug. 21-25, 2017.
3rd Generation Partnership Project; Technical Specification Group Radio Access Network; Evolved Universal Terrestrial Radio Access (E-UTRA); Physical channels and modulation (Release 15), 3GPP TS 36.211, V15.1.0 (Mar. 2018).
R1-1711951 Sony,"Open issues on SRS design",3GPP TSG RAN WG1 NR Ad-Hoc#2,Qingdao,China Jun. 27-30, 2017,total 28 pages.

* cited by examiner

SYSTEM AND METHOD FOR SOUNDING REFERENCE SIGNAL TRANSMISSION

CROSS REFERENCE TO RELATED APPLICATIONS

This application claims to the benefit of U.S. Provisional Application No. 62/543,930 entitled "System and Method for Sounding Reference Signal Transmission" filed Aug. 10, 2017, which is hereby incorporated by reference in its entirety.

TECHNICAL FIELD

The present disclosure relates generally to wireless communications, and in particular embodiments, to systems and methods for transmitting sounding reference signals.

BACKGROUND

In traditional cellular networks, each transmit/receive point (TRP) is associated with a coverage area or a traditional TRP-based cell and is assigned a traditional cell identifier (ID) to define the control channel and data channel so that simultaneous TRP to user equipment (UE) or UE to TRP communications can be supported for each traditional cell. The network may maintain the association between serving TRP and the UE through assigned traditional cell ID until a handover is triggered.

As the demand on mobile broadband increases, traditional cellular networks are deployed more densely and heterogeneously with a greater number of TRPs. Traditional cell ID assignment becomes more difficult and the occurrence rate of handovers increases as the UE moves between TRPs. Further, the density of the traditional cells creates much interference between neighboring traditional cells.

Sounding reference symbols (SRSs) are transmitted by UEs for the purpose of uplink channel measurement. A given SRS may be in the form of a Zhadoff-Chu (ZC) sequence mapped to a set of tones. Among other parameters a given ZC sequence is defined by a root. In conventional LTE systems, a cell specific root is used within each cell. All UEs transmitting in the cell employ a ZC sequence based on the same root.

SUMMARY

As noted above, in conventional LTE, a cell specific root is used within each cell. There is a need for a more flexible association between roots and UEs that, for example, allows for multiple roots to be associated with a cell. This may help with maintaining re-use distance as networks become denser.

According to one aspect of the present disclosure, there is provided a method comprising: transmitting signalling to configure a user equipment (UE) with a UE specific root to use in generating a Zadoff Chu (ZC) sequence for reference signal transmission.

Optionally, the method further comprises selecting the UE specific root for the UE from a set of roots containing greater than 60 roots.

Optionally, the method comprises selecting the UE specific root for the UE from a set of roots wherein the size of the set of roots is a function of ZC sequence length, and for at least one ZC sequence length, the size of the set of roots is greater than 60.

Optionally, the size of the set of roots is in accordance with:

| Sequence length | Number of roots |
| --- | --- |
| 36 to 60 | 30 |
| 72 to $L_1$ | 60 |
| $L_2$ to $L_3$ | $F_2(L_2)$ |
| ... | ... |
| $L_{n-1}$ to $L_n$ | $F_{n-1}(L_{n-1})$ | where the function $F_n(L_n)$ value is not larger than the available number of roots for a sequence length $L_n$.

Optionally, the size of the set of roots is in accordance with:

| | ZC length | | |
| --- | --- | --- | --- |
| | 36-60 | 72-120 | 144 and above |
| Max #Roots | 30 | 60 | 120 |

Optionally, the set of roots containing greater than 60 roots comprises roots roughly uniformly placed over a ZC sequence length without sequence hopping.

Optionally, the method further comprises generating roots for full length ZC sequences for each SRS sequence length according to:

if SRS sequence length is between 36-60:

$q=\lfloor \bar{q}+\frac{1}{2} \rfloor$ where $\bar{q}=N_{ZC}^{RS} \cdot (u+1)/31$ and $u \in \{0,1,K,29\}$;

If SRS sequence length is between 72-120:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0,1,K,29\}$, and $v \in \{0,1\}$;

If SRS sequence length is larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0,1,K,29\}$; OR If SRS sequence length is larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/67$, $u \in \{0,1,K,59\}$, and $v \in \{0,1\}$;

where: $N_{ZC}^{RS}$ is the ZC sequence length equal to the largest prime number below the SRS sequence length; the parameter u is called the sequence group number and the parameter v is called the number within the group; parameters u and v jointly determine the sequence root q as the product of number of possible values of u and number of possible values of v.

Optionally, the method further comprises generating roots for full length ZC sequences for each SRS sequence length according to:

If SRS sequence length is between 36-60:

$-q=\lfloor \bar{q}+\frac{1}{2} \rfloor$ where $\bar{q}=N_{ZC}^{RS} \cdot (u+1)/31$ and $u \in \{0,1,K,29\}$;

If SRS sequence length is between 72-120:

$-q=\lfloor \bar{q}+\frac{1}{2} \rfloor$ where $\bar{q}=N_{ZC}^{RS} \cdot (u+1)/71$, $u \in \{0,1,K,59\}$;

If SRS sequence length is larger or equal to 144:

$-q=\lfloor \bar{q}+\frac{1}{2} \rfloor$ where $\bar{q}=N_{ZC}^{RS} \cdot (u+1)/139$, $u \in \{0,1,K,119\}$;

where: $N_{ZC}^{RS}$ is the ZC sequence length equal to the largest prime number below the SRS sequence length; the parameter u is called the sequence group number and root q is determined by u.

Optionally, the method further comprises configuring a UE to use a truncated ZC sequence for sounding reference signal transmission; performing a bandwidth allocation for reference signal transmission based on tree-like bandwidth allocation structures.

Optionally, performing a bandwidth allocation for reference signal transmission based on tree-like bandwidth allocation structures comprises using multiple tree-like bandwidth allocation structures simultaneously in one bandwidth part.

Optionally, the method further comprises configuring a UE to use a truncated ZC sequence for sounding reference signal transmission; performing a bandwidth allocation for reference signal transmission that is not based on a tree-like bandwidth allocation structure, and using higher layer signalling to indicate a bandwidth allocation.

Optionally, the method further comprises performing bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

Optionally, the method further comprises receiving a sounding reference signal in accordance with the configuration.

According to another aspect of the present disclosure, there is provided a method in a user equipment (UE) comprising: receiving signalling to configure the UE with a UE specific root to use in generating a Zadoff Chu (ZC) sequence for reference signal transmission; transmitting a reference signal in accordance with the received configuration.

Optionally, the UE specific root for the UE is selected from a set of roots containing greater than 60 roots.

Optionally, the UE specific root for the UE is selected from a set of roots wherein the size of the set of roots is a function of ZC sequence length, and for at least one ZC sequence length, the size of the set of roots is greater than 60.

Optionally, the size of the set of roots is in accordance with:

| Sequence length | Number of roots |
| --- | --- |
| 36 to 60 | 30 |
| 72 to L1 | 60 |
| L2 to L3 | F2(L2) |
| ... | ... |
| Ln(n−1) to Ln | Fn(L(n−1)) | where the function Fn(Ln) value is not larger than the available number of roots for a sequence length Ln.

Optionally, the size of the set of roots is in accordance with:

| | ZC length | | |
| --- | --- | --- | --- |
| | 36-60 | 72-120 | 144 and above |
| Max #Roots | 30 | 60 | 120 |

Optionally, the set of roots containing greater than 60 roots comprises roots roughly uniformly placed over a ZC sequence length without sequence hopping Optionally, roots for full length ZC sequences for each SRS sequence length are according to: if SRS sequence length is between 36-60:

$q = \lfloor \bar{q} + \frac{1}{2} \rfloor$ where $\bar{q} = N_{ZC}^{RS} \cdot (u+1)/31$ and $u \in \{0,1,K, 29\}$;

If SRS sequence length is between 72-120:

$q = \lfloor \bar{q} + \frac{1}{2} \rfloor + v \cdot (-1)^{\lfloor 2\bar{q} \rfloor}$ where $\bar{q} = N_{ZC}^{RS} \cdot (u+1)/31$, $u \in \{0, 1, K, 29\}$, and $v \in \{0,1\}$;

If SRS sequence length is larger or equal to 144:

$q = \lfloor \bar{q} + \frac{1}{2} \rfloor + v \cdot (-1)^{\lfloor 2\bar{q} \rfloor}$ where $\bar{q} = N_{ZC}^{RS} \cdot (u+1)/31$, $u \in \{0, 1, K, 29\}$; OR If SRS sequence length is larger or equal to 144:

$q = \lfloor \bar{q} + \frac{1}{2} \rfloor + v \cdot (-1)^{\lfloor 2\bar{q} \rfloor}$ where $\bar{q} = N_{ZC}^{RS} \cdot (u+1)/67$, $u \in \{0, 1, K, 59\}$, and $v \in \{0,1\}$;

where: $N_{ZC}^{RS}$ is the ZC sequence length equal to the largest prime number below the SRS sequence length; the parameter u is called the sequence group number and the parameter v is called the number within the group; parameters u and v jointly determine the sequence root q as the product of number of possible values of u and number of possible values of v.

Optionally, roots for full length ZC sequences for each SRS sequence length are according to:
If SRS sequence length is between 36-60:

$-q = \lfloor \bar{q} + \frac{1}{2} \rfloor$ where $\bar{q} = N_{ZC}^{RS} \cdot (u+1)/31$ and $u \in \{0,1,K, 29\}$;

If SRS sequence length is between 72-120:

$-q = \lfloor \bar{q} + \frac{1}{2} \rfloor$ where $\bar{q} = N_{ZC}^{RS} \cdot (u+1)/71$, $u \in \{0,1,K,59\}$;

If SRS sequence length is larger or equal to 144:

$-q = \lfloor \bar{q} + \frac{1}{2} \rfloor$ where $\bar{q} = N_{ZC}^{RS} \cdot (u+1)/139$, $u \in \{0,1,K, 119\}$;

where: $N_{ZC}^{RS}$ is the ZC sequence length equal to the largest prime number below the SRS sequence length; the parameter u is called the sequence group number and root q is determined by u.

Optionally, the method further comprises receiving signaling to configure the UE to use a truncated ZC sequence for sounding reference signal transmission; receiving signaling of a bandwidth allocation for reference signal transmission based on tree-like bandwidth allocation structures.

Optionally, the bandwidth allocation for reference signal transmission based on tree-like bandwidth allocation structures uses multiple tree-like bandwidth allocation structures simultaneously in one bandwidth part.

Optionally, the method further comprises receiving signaling to configure the UE to use a truncated ZC sequence for sounding reference signal transmission; receiving higher signalling of a bandwidth allocation for reference signal transmission that is not based on a tree-like bandwidth allocation structure.

Optionally, the method further comprises receiving signalling of a bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

Optionally, the method further comprises transmitting a sounding reference signal in accordance with the configuration.

According to another aspect of the present disclosure, there is provided a base station comprising: a processor, memory, transmitter and receiver; the base station configured to transmit signalling to configure a user equipment (UE) with a UE specific root to use in generating a Zadoff Chu (ZC) sequence for reference signal transmission, and to receive reference signal transmission based on the configuration.

Optionally, the base station is further configured to select the UE specific root for the UE from a set of roots containing greater than 60 roots.

Optionally, The base station is further configured to select the UE specific root for the UE from a set of roots wherein the size of the set of roots is a function of ZC sequence length, and for at least one ZC sequence length, the size of the set of roots is greater than 60.

Optionally, the size of the set of roots is in accordance with:

| Sequence length | Number of roots |
| --- | --- |
| 36 to 60 | 30 |
| 72 to $L_1$ | 60 |
| $L_2$ to $L_3$ | $F_2(L_2)$ |
| ... | ... |
| $L_{n-1}$ to $L_n$ | $F_{n-1}(L_{n-1})$ | where the function $F_n(L_n)$ value is not larger than the available number of roots for a sequence length $L_n$.

Optionally, the size of the set of roots is in accordance with:

| | ZC length | | |
| --- | --- | --- | --- |
| | 36-60 | 72-120 | 144 and above |
| Max #Roots | 30 | 60 | 120 |

Optionally, the set of roots containing greater than 60 roots comprises roots roughly uniformly placed over a ZC sequence length without sequence hopping.

Optionally, the base station is further configured to generate roots for full length ZC sequences for each SRS sequence length according to:

if SRS sequence length is between 36-60:

$-q=\lfloor \bar{q}+\frac{1}{2} \rfloor$ where $\bar{q}=N_{ZC}^{RS} \cdot (u+1)/31$ and $u \in \{0,1,K,29\}$;

If SRS sequence length is between 72-120:

$q=\lfloor \bar{q}+\frac{1}{2} \rfloor+v \cdot (-1)^{\lfloor 2\bar{q} \rfloor}$ where $\bar{q}=N_{ZC}^{RS} \cdot (u+1)/31$, $u \in \{0,1,K,29\}$, and $v \in \{0,1\}$;

If SRS sequence length is larger or equal to 144:

$q=\lfloor \bar{q}+\frac{1}{2} \rfloor+v \cdot (-1)^{\lfloor 2\bar{q} \rfloor}$ where $\bar{q}=N_{ZC}^{RS} \cdot (u+1)/31$, $u \in \{0,1,K,29\}$; OR If SRS sequence length is larger or equal to 144:

$q=\lfloor \bar{q}+\frac{1}{2} \rfloor+v \cdot (-1)^{\lfloor 2\bar{q} \rfloor}$ where $\bar{q}=N_{ZC}^{RS} \cdot (u+1)/67$, $u \in \{0,1,K,59\}$, and $v \in \{0,1\}$;

where: $N_{ZC}^{RS}$ is the ZC sequence length equal to the largest prime number below the SRS sequence length; the parameter u is called the sequence group number and the parameter v is called the number within the group; parameters u and v jointly determine the sequence root q as the product of number of possible values of u and number of possible values of v.

Optionally, the base station is further configured to generate roots for full length ZC sequences for each SRS sequence length according to:

If SRS sequence length is between 36-60:

$-q=\lfloor \bar{q}+\frac{1}{2} \rfloor$ where $\bar{q}=N_{ZC}^{RS} \cdot (u+1)/31$ and $u \in \{0,1,K,29\}$;

If SRS sequence length is between 72-120:

$-q=\lfloor \bar{q}+\frac{1}{2} \rfloor$ where $\bar{q}=N_{ZC}^{RS} \cdot (u+1)/71$, $u \in \{0,1,K,59\}$;

If SRS sequence length is larger or equal to 144:

$-q=\lfloor \bar{q}+\frac{1}{2} \rfloor$ where $\bar{q}=N_{ZC}^{RS} \cdot (u+1)/139$, $u \in \{0,1,K,119\}$;

Where $N_{ZC}^{RS}$ is the ZC sequence length equal to the largest prime number below the SRS sequence length; the parameter u is called the sequence group number and root q is determined by u.

Optionally, the base station is further configured to: configure a UE to use a truncated ZC sequence for sounding reference signal transmission; perform a bandwidth allocation for reference signal transmission based on tree-like bandwidth allocation structures.

Optionally, the base station is configured to perform a bandwidth allocation for reference signal transmission based on tree-like bandwidth allocation structures by using multiple tree-like bandwidth allocation structures simultaneously in one bandwidth part.

Optionally, the base station is further configured: configure a UE to use a truncated ZC sequence for sounding reference signal transmission; perform a bandwidth allocation for reference signal transmission that is not based on a tree-like bandwidth allocation structure, and use higher layer signalling to indicate a bandwidth allocation.

Optionally, the base station is further configured to perform bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

Optionally, the base station is further configured to receive a sounding reference signal in accordance with the configuration.

According to another aspect of the present disclosure, there is provided a user equipment (UE) comprising: a processor, memory, transmitter and receiver; the UE configured to receive signalling to configure the UE with a UE specific root to use in generating a Zadoff Chu (ZC) sequence for reference signal transmission, and to transmit a reference signal in accordance with the received configuration.

Optionally, the UE specific root for the UE is selected from a set of roots containing greater than 60 roots.

Optionally, the UE specific root for the UE is selected from a set of roots wherein the size of the set of roots is a function of ZC sequence length, and for at least one ZC sequence length, the size of the set of roots is greater than 60.

Optionally, the size of the set of roots is in accordance with:

| Sequence length | Number of roots |
| --- | --- |
| 36 to 60 | 30 |
| 72 to L1 | 60 |
| L2 to L3 | F2(L2) |
| ... | ... |
| Ln(n-1) to Ln | Fn(L(n-1)) | where the function Fn(Ln) value is not larger than the available number of roots for a sequence length Ln.

Optionally, the size of the set of roots is in accordance with:

| | ZC length | | |
|---|---|---|---|
| | 36-60 | 72-120 | 144 and above |
| Max #Roots | 30 | 60 | 120 |

Optionally, the set of roots containing greater than 60 roots comprises roots roughly uniformly placed over a ZC sequence length without sequence hopping Optionally, roots for full length ZC sequences for each SRS sequence length are according to:
if SRS sequence length is between 36-60:

$q=\lfloor \bar{q}+½ \rfloor$ where $\bar{q}=N_{ZC}^{RS}\cdot(u+1)/31$ and $u\in\{0,1,K,29\}$;

If SRS sequence length is between 72-120:

$q=\lfloor \bar{q}+½ \rfloor+v\cdot(-1)^{\lfloor 2\bar{q} \rfloor}$ where $\bar{q}=N_{ZC}^{RS}\cdot(u+1)/31$, $u\in\{0,1,K,29\}$, and $v\in\{0,1\}$;

If SRS sequence length is larger or equal to 144:

$q=\lfloor \bar{q}+½ \rfloor+v\cdot(-1)^{\lfloor 2\bar{q} \rfloor}$ where $\bar{q}=N_{ZC}^{RS}\cdot(u+1)/31$, $u\in\{0,1,K,29\}$; OR If SRS sequence length is larger or equal to 144:

$q=\lfloor \bar{q}+½ \rfloor+v\cdot(-1)^{\lfloor 2\bar{q} \rfloor}$ where $\bar{q}=N_{ZC}^{RS}\cdot(u+1)/67$, $u\in\{0,1,K,59\}$, and $v\in\{0,1\}$;

where: $N_{ZC}^{RS}$ is the ZC sequence length equal to the largest prime number below the SRS sequence length; the parameter u is called the sequence group number and the parameter v is called the number within the group; parameters u and v jointly determine the sequence root q as the product of number of possible values of u and number of possible values of v.

Optionally, roots for full length ZC sequences for each SRS sequence length are according to:
If SRS sequence length is between 36-60:

$-q=\lfloor \bar{q}+½ \rfloor$ where $\bar{q}=N_{ZC}^{RS}\cdot(u+1)/31$ and $u\in\{0,1,K,29\}$;

If SRS sequence length is between 72-120:

$-q=\lfloor \bar{q}+½ \rfloor$ where $\bar{q}=N_{ZC}^{RS}\cdot(u+1)/71$, $u\in\{0,1,K,59\}$;

If SRS sequence length is larger or equal to 144:

$-q=\lfloor \bar{q}+½ \rfloor$ where $\bar{q}=N_{ZC}^{RS}\cdot(u+1)/139$, $u\in\{0,1,K,119\}$;

Where $N_{ZC}^{RS}$ is the ZC sequence length equal to the largest prime number below the SRS sequence length; the parameter u is called the sequence group number and root q is determined by u.

Optionally, the UE is further configured to: receive signaling to configure the UE to use a truncated ZC sequence for sounding reference signal transmission; receive signaling of a bandwidth allocation for reference signal transmission based on tree-like bandwidth allocation structures.

Optionally, the bandwidth allocation for reference signal transmission based on tree-like bandwidth allocation structures uses multiple tree-like bandwidth allocation structures simultaneously in one bandwidth part.

Optionally, the UE is further configured to: receive signaling to configure the UE to use a truncated ZC sequence for sounding reference signal transmission; receive higher signalling of a bandwidth allocation for reference signal transmission that is not based on a tree-like bandwidth allocation structure.

Optionally, the UE is further configured to: to receive signalling of a bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

Optionally, the UE is further configured to: to transmit a sounding reference signal in accordance with the configuration.

BRIEF DESCRIPTION OF THE DRAWINGS

Embodiments of the disclosure will now be described with reference to the attached drawings in which.

DETAILED DESCRIPTION OF ILLUSTRATIVE EMBODIMENTS

As noted above, in conventional LTE, a cell specific root is used within each cell. There is a need for a more flexible association between roots and UEs that, for example, allows for multiple roots to be associated with a cell. This may help with maintaining re-use distance as networks become denser. In some embodiments, rather than associating a root with a cell, roots are associated with sequence ID, and multiple sequence IDs may be used within a cell.

LTE Root Number

In LTE, the available roots are determined based on the length L of the ZC sequence as follows:

For L<36, use QPSK sequence

For L=36, $N_{zc}$=31 and a total of 30 roots are all used

For L>36, 30 roots per sequence length, with roots are uniformly distributed $q=N_{zc}(u+1)/31$ on the sequence length For L>=72 and with sequence hopping, expand to 60 roots per sequence length based on uniform root selection by replacing each root with two roots $q=\lfloor \bar{q}+½ \rfloor+v\cdot(-1)^{\lfloor 2\bar{q} \rfloor}$ In the above, the parameter u is call the sequence group number and the parameter v is called the number within the group; and parameter u and v jointly determines the sequence root q. The number of roots is determined by u and v, specifically it is the product of number of possible value of u and number of possible value of v.

Figure 1:
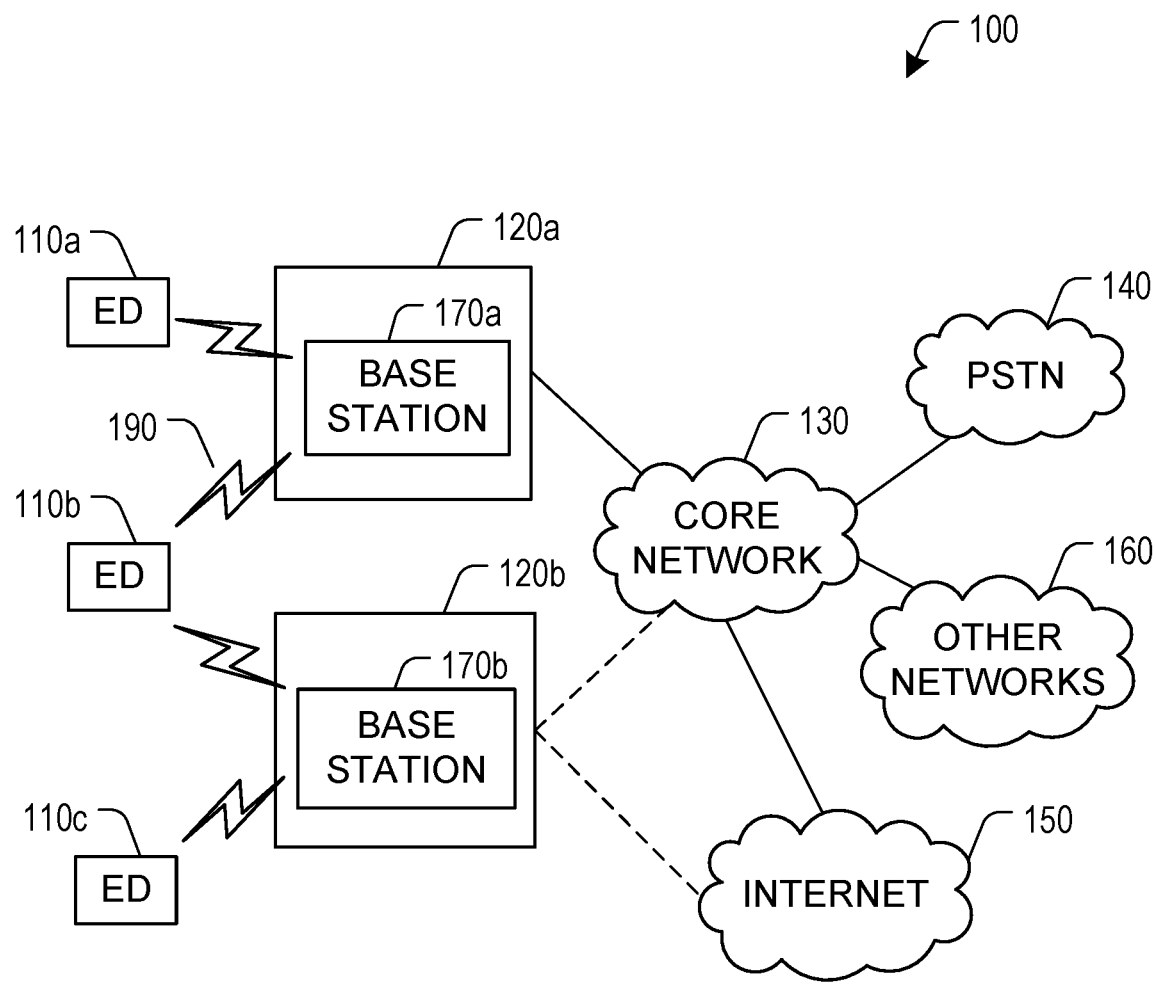
FIG. 1 is a block diagram of an example communication system within in which embodiments of the present disclosure could be implemented.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, multiple-input multiple-output (MIMO) technology may be employed having multiple transceivers for each coverage area. The number of RAN 120a-120b shown is exemplary only. Any number of RAN may be contemplated when devising the system 100.

The base stations 170a-170b communicate with one or more of the EDs 110a-110c over one or more air interfaces 190 using wireless communication links e.g. RF, pWave, IR, etc. The air interfaces 190 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

It is contemplated that the communication system 100 as illustrated in FIG. 1 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, each data channel serving a different UE.

In another embodiment, a broadcast common control channel and a dedicated control channel may be supported. The broadcast common control channel may carry common system configuration information transmitted by all or partial TRPs sharing the same NR cell ID. Each UE can decode information from the broadcast common control channel in accordance with information tied to the NR cell ID. One or more TRPs within a NR cell may transmit a UE specific dedicated control channel, which serves a UE and carries UE-specific control information associated with the UE. Multiple parallel dedicated control channels within a single NR cell may be supported, each dedicated control channel serving a different UE. The demodulation of each dedicated control channel may be performed in accordance with a UE-specific reference signal (RS), the sequence and/or location of which are linked to the UE ID or other UE specific parameters.

In some embodiments, one or more of these channels, including the dedicated control channels and the data channels, may be generated in accordance with a UE specific parameter, such as a UE ID, and/or an NR cell ID. Further, the UE specific parameter and/or the NR cell ID can be used to differentiate transmissions of the data channels and control channels from different NR cells.

An ED, such as a UE, may access the communication system 100 through at least one of the TRP within a NR cell using a UE dedicated connection ID, which allows one or more physical TRPs associated with the NR cell to be transparent to the UE. The UE dedicated connection ID is an identifier that uniquely identifies the UE in the NR cell. For example, the UE dedicated connection ID may be identified by a sequence. In some implementations, the UE dedicated connection ID is assigned to the UE after an initial access. The UE dedicated connection ID, for example, may be linked to other sequences and randomizers which are used for PHY channel generation.

In some embodiments, the UE dedicated connection ID remains the same as long as the UE is communicating with a TRP within the NR cell. In some embodiments, the UE can keep original UE dedicated connection ID when crossing NR cell boundary. For example, the UE can only change its UE dedicated connection ID after receiving signaling from the network.

It is obviously understood that any number of NR cells may be implemented in the communication system 100. For example, FIG. 2 illustrates two neighboring NR cells in an example communication system, in accordance with an embodiment of the present disclosure.

Figure 2:
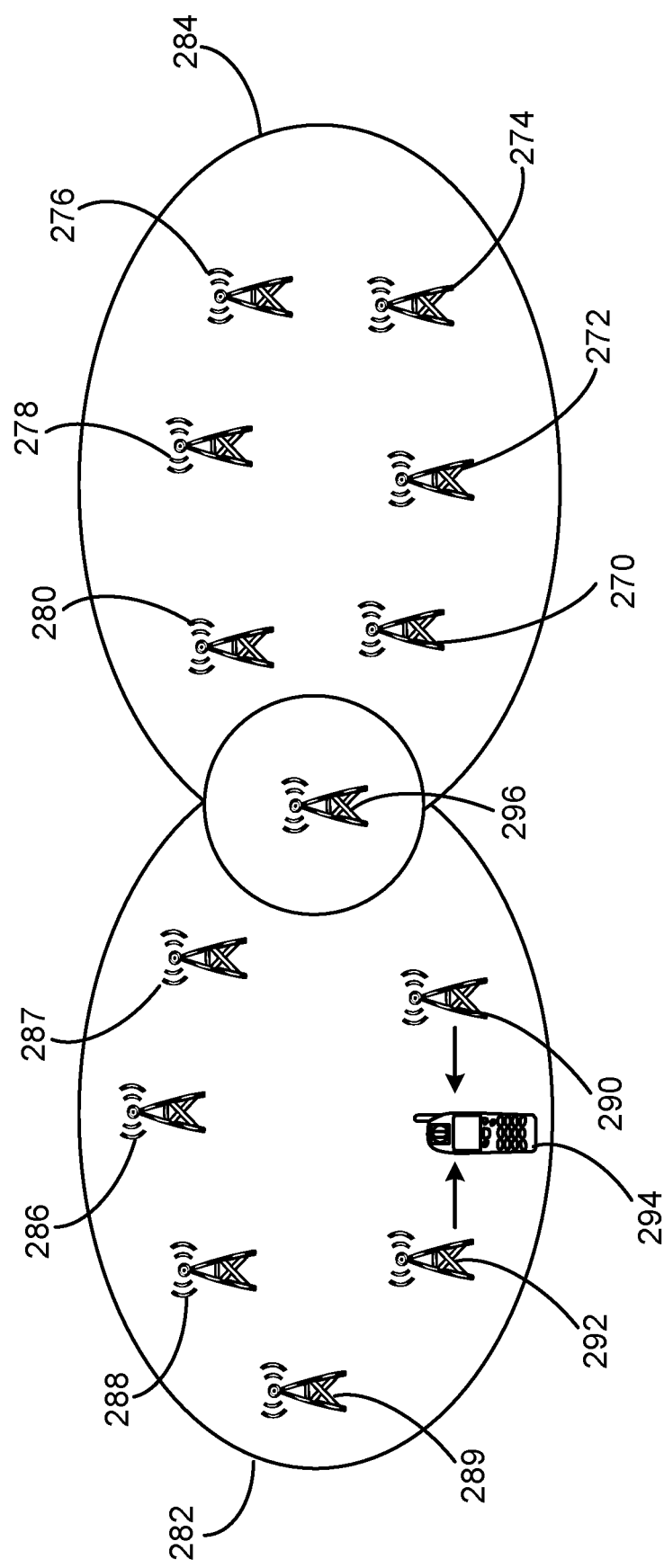
FIG. 2 is a block diagram of two neighboring NR cells in an example communications system.

As illustrated in FIG. 2, NR cells 282, 284 each includes multiple TRPs that are assigned the same NR cell ID. For example, NR cell 282 includes TRPs 286, 287, 288, 289, 290, and 292, where TRPs 290, 292 communicates with an ED, such as UE 294. It is obviously understood that other TRPs in NR cell 282 may communicate with UE 294. NR cell 284 includes TRPs 270, 272, 274, 276, 278, and 280. TRP 296 is assigned to NR cells 282, 284 at different times, frequencies or spatial directions and the system may switch the NR cell ID for transmit point 296 between the two NR cells 282 and 284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand NR cell to include other TRPs if the concentration of UEs located at the edge of the NR cell increases above a certain threshold. As another example, the system may expand NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 296 from the NR cell ID of NR cell 282 to the NR cell ID of NR cell 284. In one implementation, the system can change the association of a TRP with different NR cells periodically, such as every 1 millisecond. With such a flexible NR cell formation mechanism, all UEs can be served by the best TRPs so that virtually there are no cell edge UEs.

In yet another embodiment, the shared TRP 296 can reduce interference for UEs located at the boundary between the two NR cells 282, 284. UEs that are located near the boundaries of two NR cells 282, 284 experience less handovers because the shared TRP is associated with either NR cell at different times, frequencies or spatial directions. Further, as a UE moves between the NR cells 282, 284, the transition is a smoother experience for the user. In one embodiment, the network changes the NR cell ID of the TRP 296 to transition a UE moving between NR cells 282, 284.

The system may apply TRP selection techniques to minimize intra-NR cell interference and inter-NR cell interference. In one embodiment, a TRP sends a downlink channel state information (CSI)-reference symbol (RS). Some pilot (also known as reference signal) ports may be defined such that the UEs can measure the channel state information and report it back to the network. A CSI-RS port is a pilot port defined as a set of known symbols from a sequence transmitted over known resource elements (for example OFDM resource elements) for UEs to measure the channel state. A UE assigned to measure a particular CSI-RS port can measure the transmitted CSI-RS sequence, measure the associated channel state and report it back to the network. The network, such as a controller, may select the best TRPs for all served UEs based on the downlink measurements. In another embodiment, a TRP detects an uplink sounding reference signal (SRS) sequence from a UE in the configured time-frequency resources. For example, Constant Amplitude Zero Auto Correlation (CAZAC) sequences such as ZC sequences can be used as base sequences for SRS. The TRP reports a measurement of the detected uplink SRS sequence to the network, such as a controller. The controller then selects the optimal TRPs for all served UEs based on the measurements.

SRS Sequence Design and Resource Mapping

Embodiments of the disclosure provide methods of SRS sequence design, which allow a configuration of which ZC sequence should be transmitted by which UE, and also provide methods of resource mapping for SRS transmission. These methods allow configuration of which time frequency resources a given UE should use to transmit SRSs. Based on these methods, corresponding methods of configuring a UE for SRS transmission, and methods of receiving such configuration by a UE and transmitting the SRS in accordance with the configuration are provided.

SRS Sequence Background

As noted above, Zadoff-Chu (ZC) sequences may be used for sounding reference symbol (SRS) transmissions. SRSs are transmitted on the uplink by user equipment for the network to make channel measurements on the uplink channel. More generally, the embodiments described herein can also be applied to any type of uplink reference symbols that make use of ZC sequences, SRS being a specific example.

Three parameters of sequence length, root and cyclic shift determine a ZC sequence. For a ZC sequence of length N, the largest prime number less than N is $N_{LP}$, and there are $N_{LP}-1$ possible roots q, where q=1, . . . , $N_{LP}-1$. In addition, there are $N_{LP}$ possible cyclic shifts $CS=CS_i$, i=0, . . . , $N_{LP}-1$. A ZC sequence is uniquely defined by the function f(N, q, CS) which is a sequence that has N values. ZC sequence computation from this function is well known in the art and will not be repeated here.

To transmit an SRS, each of the N values in the ZC sequence is transmitted on a respective tone, a tone being the time frequency resource provided by one sub-carrier for one OFDM symbol duration. The tones used may be spaced across a sounding bandwidth according to a comb parameter. For example, every $4^{th}$ sub-carrier might be used for the SRS. Typically an SRS is transmitted by each UE at least once per slot, where a slot is a timeframe composed of a plurality of OFDM symbol durations.

Two types of ZC sequence design are provided and detailed herein. These are referred to herein as full length ZC sequence design, and a truncated ZC sequence design. With full length ZC sequence design, a complete ZC sequence is transmitted in an SRS transmission. With truncated ZC sequence design, only a portion of a ZC sequence is transmitted in an SRS transmission.

LTE-Like Design

LTE-like sequence design is a specific example of full length ZC sequence design. The LTE-like sequence design is referred to as such due to similarities to an approach used in LTE. The SRS sequence is a function of the sounding bandwidth (in the sense that the sequence length N is a function of the sounding bandwidth as detailed above) and does not depend on the sounding bandwidth position within an overall bandwidth, or physical resource block (PRB) position. Thus, a UE configured to transmit a ZC sequence defined by f(N,q,CS) will transmit the same sequence irrespective of the sounding bandwidth position or physical resource blocks assigned for SRS transmission.

As such, after the sounding bandwidth, comb size, root and cyclic shift of the sequence are assigned to the UE, the sequence is generated according to the bandwidth size and comb size, and mapped to that bandwidth.

With the LTE-like design, partial overlap between sounding bandwidths of different UEs is NOT allowed among sequences generated from the same root, as otherwise orthogonality cannot be kept. Thus, two UEs with the same bandwidth size and root should either be configured to transmit SRS using either completely overlapping resources, or completely non-overlapping resources. This means the flexibility of SRS scheduling is limited.

In either case, there is good orthogonality between the transmissions of different UEs. In addition, the LTE-like design provides an acceptable peak average power ratio (PAPR) and cubic metric (CM).

Truncated ZC Design

Unlike the case for the LTE-like design, with the truncated ZC design, an SRS sequence is a function of the sounding bandwidth position or PRB position. A long mother ZC sequence is generated to cover an entire SRS bandwidth (its sequence length equals or exceeds SRS bandwidth). A portion of the sequence is assigned to each UE. The portion is truncated from the mother sequence corresponding to the SRS bandwidth location assigned to UE.

With the truncated ZC design, partial overlap between sounding bandwidth of different UEs is allowed among sequences generated from the same root, while orthogonality between UEs may still be maintained, in the case that partial overlap granularity conditions detailed below are satisfied. However, there is not a guarantee of low PAPR or low CM for all roots. As such, for truncated ZC design, typically specific roots that results in satisfactory PAPR and cubic metric (CM) are found through computer search. Allowing partial overlap among sequences leads to more scheduling flexibility.

Sequence Root Generation

In LTE, all SRS sequences of a specific length of a given cell are generated from a single cell-specific root; this root is mapped from physical cell ID. In LTE, 30 or 60 such distinct roots can be generated. For sequence lengths between 36 and 60, 30 roots are generated, and for sequence lengths between 72 and a maximum sequence length, up to 60 roots can be generated. For example, for a sequence length of 60, the roots might include 2, 4, 6, . . . . In this case, a mapping from physical cell ID to root position or index in the generated set assigns a root to a cell with a given physical cell ID. For example, cells with physical cell IDs cell_ID_1, cell_ID_2, cell_ID_3, . . . might be mapped to roots 2, 4, 6, . . . .

In accordance with an embodiment of the disclosure, for example for use in New Radio (NR) systems, both LTE-like design and truncated ZC design are supported, and roots are associated with sequence IDs instead of physical cell IDs. This has the advantage that more than one root can be assigned to a given cell. The sequence ID is used to generate an associated root. This approach may be used to generate 30 roots, 60 roots, or in some embodiments a larger number of roots.

LTE-Like Design with Additional Roots

An embodiment of the disclosure provides LTE-like design with additional roots, i.e. more than the 60 maximum provided for by current LTE specifications.

A larger number of roots may be useful with a larger SRS bandwidth and SRS sequence length. For example, NR maximum channel bandwidth per NR carrier can be up to 400 MHz in Rel-15. For single numerology, the maximum number of subcarriers per NR carrier is 3300 or 6600 in Rel-15, but it should be clearly understood that the approaches described herein are not limited to any specific channel bandwidth.

Figure 3:
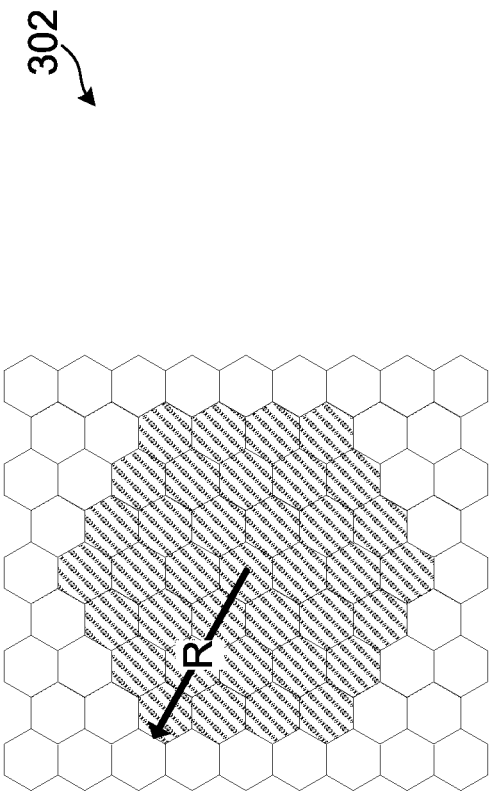
FIG. 3 depicts cell layouts for different cell densities, showing why larger number of roots is needed to maintain reuse distance.
Figure 3:
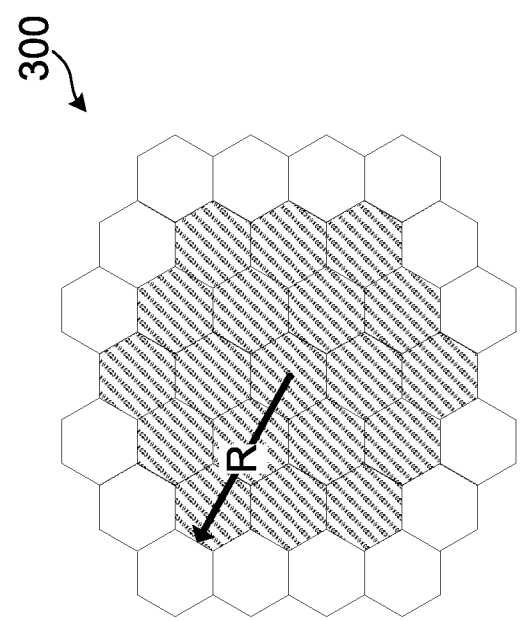

NR systems may feature smaller cells and a more densified network. If reusing the same 30/60 roots as in LTE, the reuse distance is smaller. Referring to FIG. 3, generally indicated at 300, 302 are a first cell layout and a second relatively denser layout respectively. A reuse distance R is depicted in both cell layouts, this representing a distance outside of which the same root can be reused which conversely means that all cells within the radius R use different roots. To keep the same reuse distance for the more dense cell layout 302, a larger number of roots (that is larger than 60) is needed.

NR uses more cell IDs, larger UE density, and more UE SRS ports. The number of physical cell IDs increases from 504 to 1008. Connection density might for example be of 1,000,000 devices/km$^2$ in urban environment (38.913, section 7.17). Potentially more SRS ports (N=1, 2, 4 at least, FFS 3 and 8) than LTE (4 ports maximum) might be provided.

In accordance with an embodiment of the disclosure, a number of sequence roots is configured that is a function of sequence length. A specific example is provided in Table 1 below, where the function Fn(Ln) value is not larger than the available number of roots for a sequence length Ln.

TABLE 1

Example of Number of Roots as a function of Sequence Length

| Sequence length | Max Number of roots |
|---|---|
| 36 to 60 | 30 |
| 72 to $L_1$ | 60 |
| $L_2$ to $L_3$ | $F_2(L_2)$ |
| ... | ... |
| $L_{n-1}$ to $L_n$ | $F_{n-1}(L_{n-1})$ |

In the above table, Ln is the length of sequence, Fn−1 (Ln−1) is the resulting max number of roots in the sequence length range of [Ln−1, Ln]

In specific examples, the number of roots as a function of sequence length is as shown in one of Tables 2, 3 and 4 below.

TABLE 2

Example of Maximum Number of Roots as a function of Sequence Length

| | ZC length | | |
|---|---|---|---|
| | 36-60 | 72-120 | 144 and above |
| Max #Roots | 30 | 60 | 120 |

TABLE 3

Example of Maximum Number of Roots as a function of Sequence Length

| | ZC Length | | | |
|---|---|---|---|---|
| | 36-30 | 72-96 | 108-120 | 144 and above |
| Max # Roots | 30 | 60 | 90 | 120 |

TABLE 4

Example of Maximum Number of Roots as a function of Sequence Length

| | ZC length | | |
|---|---|---|---|
| | 36-60 | 72-96 | 108 and above |
| Max #Roots | 30 | 60 | 90 |

In some embodiments, the roots are in accordance with the equations in R1-1712239 in 3GPP TSG RAN1. Meeting as set out below for the above Table 2.

LTE-Like Design: Root Selection (1)

Root design has two steps. In the first step, a subset of a set of available roots is configured. In the second step, mapping of sequence ID to the subset of roots is configured.

Root Subset Configuration

It is desirable to select a set of roots for which the corresponding ZC sequences have low mean cross-correlation. The sequence for a given root has a cross-correlation with a sequence with another root. The average of these cross-correlations for all possible partial overlapping patterns, cyclic shift, and comb sizes, for a given root is the mean cross-correlation for that root. In the root selection process for the LTE-like design, it is found that the selection of roots is not sensitive in terms of inter-root cross correlation. For one root of one sequence length, its mean cross correlation is close to that of other roots of the same sequence length.

A design objective is to find M roots for use in NR such that for each sequence length, the average cross correlation between roots is minimized. In NR it is possible to have more resource blocks (RBs) for SRS transmission than in conventional LTE. For example, for the 50 RB system bandwidth case, according to 36.211, the possible number of RBs for UE-specific SRS transmission is

[4, 8, 12, 16, 20, 24, 32, 36, 40, 48]

For comb size 2 and 4, the possible ZC sequence lengths are

[36, 48, 60, 72, 96, 108, 120, 144, 192, 216, 240, 288]

For the LTE-like design, for length 48 and 60, select 30 roots for each length. For length 72 to 120, select 60 roots for each length (or a larger number which may be a function of length, if a larger number of roots is supported as per previously described embodiment, for example as per Table 2 above). For example, for length 144 and above, select 120 roots for each length.

LTE-Like Design: Root Selection

Root selection may be performed for sequence length 48, and for other sequence lengths up to a maximum sequence length. In a very specific example, this involves selecting roots for sequence length 48, then for sequence length 60, and so on until selecting roots for sequence length 288. For each root of each sequence length, the mean cross correlation values are obtained between the generated sequences and the other sequence with equal or smaller length.

Results are averaged over different combinations of comb sizes, cyclic shifts, roots of the other sequence with equal or smaller lengths, and (partial) overlapping patterns.

In doing cross correlation between this sequence and the other sequence:

If the other sequence has smaller length, roots of the other sequence are chosen among its selected roots in previous loops (either 30 or 60);

If the other sequence has equal length, roots of the other sequence are chosen among all possible roots.

(Partial) overlapped patterns between the two sequences may be obtained via sliding one sequence each time by a step of 2 RBs in frequency.

Select 30 (if L<=60) or 60 (if 72=<L<=120) or 120 (if L>=144) roots out of all possible roots of this sequence length with smallest mean cross correlation value.

The same approach can be used where a larger number of roots is used, as introduced above.

Figure 4:
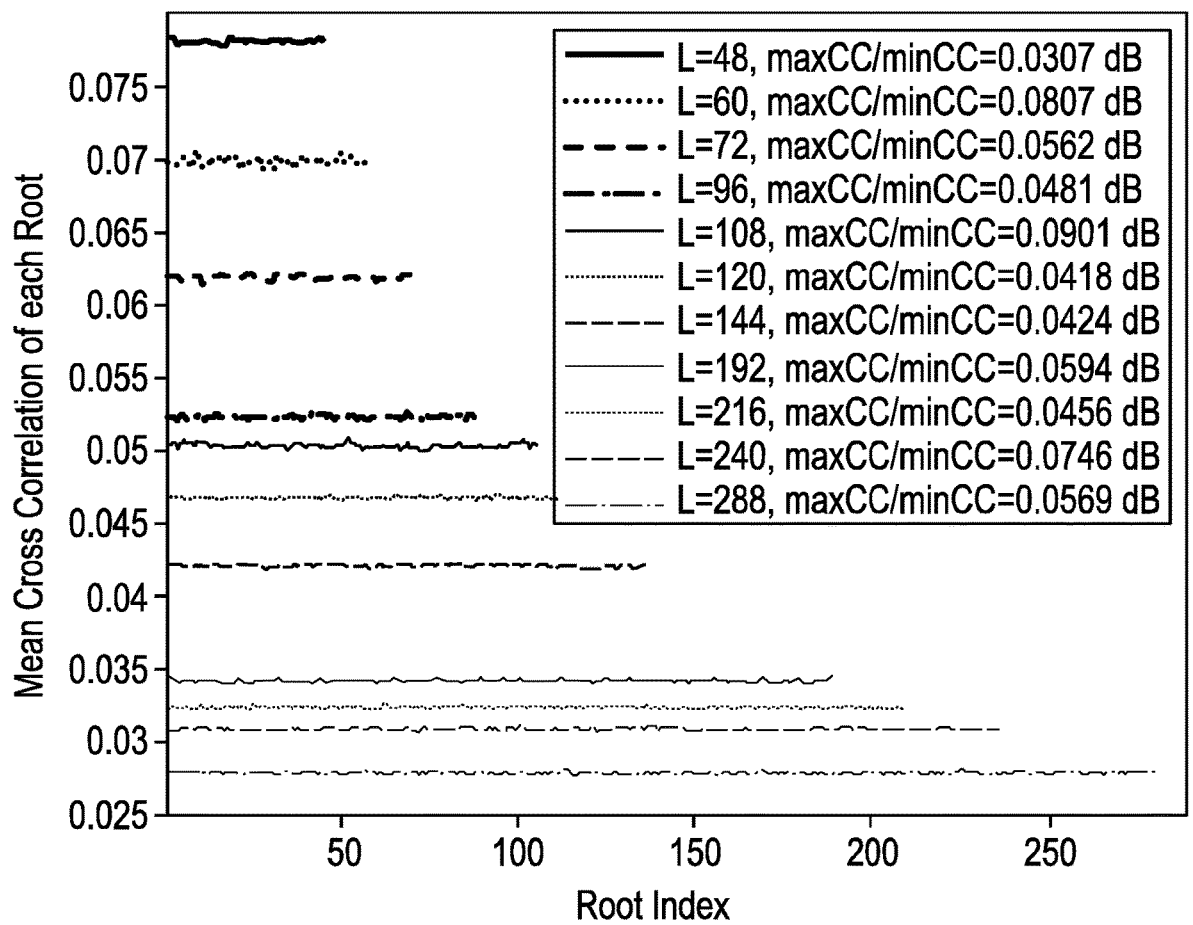
FIG. 4 is a plot of mean cross correlations of each root within a set of roots.

For a given sequence length, the ratio of the maximum mean cross correlation among its roots to the minimum mean cross correlation among its roots is at most 0.09 dB. This is shown in FIG. 4, where the mean cross correlation for each root is shown for various sequence lengths. For a given sequence length, the mean cross correlations for all the roots shows very little variability.

In some embodiments, for LTE-like root design, root generation is in accordance with one of two approaches. In the first approach (referred to below as P1), roots are roughly uniformly placed over each sequence length with sequence hopping like in LTE, i.e., select roots that are roughly uniformly placed over each sequence length to generate a base number of N roots, with optional sequence hopping to generate an additional N roots (or additional M>N roots). Sequence hopping means each cell does not have a fixed single root; it can have different roots in different time slots. For example, one cell might select root 8 in a given time slot and then select root 9 in the next slot, and then select root 8 again in the following slot and so on. For example, an available root subset [2, 4, 6 . . . ] with sequence hopping can become for example [1, 2, 3, 4, 5, 6 . . . ], as cell one now does not only have root 2, but can have root 1 and 2 in different slots. In the second approach (referred to below as P2), the roots are always roughly uniformly placed over each sequence length without sequence hopping.

Alternatively, in some embodiments, a unified method for sequence root generation for both LTE-like and truncated sequence design is provided, meaning that the same formula/table (perhaps with different parameters) can be applied to generate roots for both LTE-like and truncated ZC design. The following is a specific example of a unified method. The method begins with selecting roots for truncated ZC design for the length of mother sequence using a computer search. The method continues with mapping the roots selected for the truncated ZC design proportionally to each sequence length of LTE-like design. This mapping function can be a formula as a function of sequence length. For example, consider designing the roots for a truncated ZC design with a mother code of length 1000, and LTE-like design for a sequence of length 100. A set of roots, e.g. 30 roots, is found using computer search for the truncated ZC design. These will be between 1 and 997 (the largest prime less than 1000). Then, the 30 roots are mapped proportionally to the LTE sequence length of 100 (with rounding to ensure integer root position).

Thus the result of root subset configuration is a first set of roots for LTE-like and a second set of roots for truncated ZC design.

Mapping of Sequence IDs to Roots of Root Subset

In accordance with an embodiment of the disclosure, an SRS sequence ID is configured for each UE, and the sequence ID maps to a root of the root subset. In a specific example, the SRS sequence ID is a function of UE ID or a configurable ID, but may also be a function of cell ID. A given UE is configured with, or otherwise made aware of the sequence ID it is to use, and based on the sequence ID, the UE can determine the ZC sequence to use for LTE-like or truncated ZC SRS sequence transmission.

For LTE-like sequence design, the root is a function of sequence ID, sequence length, and scheduled time. In some embodiments, group hopping and sequence hopping can be a function of cell ID or sequence ID. Group hopping is a specific example of root configuration that is a function of scheduled time. For the relation between root and scheduled time (t), for group hopping in LTE, the network can configure a pattern, such that in time slot t one cell uses one root, and in time t+1 this cell uses another root. The system also makes sure that in each time slot, 30 cells use 30 distinct roots. So in this sense cell-to-root mapping can be a function of time. In accordance with an embodiment of the disclosure or NR, the sequence ID-to root mapping is a function of time. Another example of root configuration that is a function of time is the sequence hopping approach explained above.

The following is a specific example of LTE-like sequence design provided by an embodiment of the disclosure.

Due to the fact that ZC roots provide similar average cross correlation properties, either of the following root generation mechanisms can be used for LTE-like SRS:

Either of the following methods P1 and P2 can be used to generate ZC root for each SRS sequence length.

P1: Similar root selection principle as in LTE using sequence hopping for sequence length larger than 60. In this case, ZC sequence root q is given by (corresponding to root number distribution example in table 2):

P1-1) For SRS sequence length 36-60:

$q=\lfloor \bar{q}+\frac{1}{2} \rfloor$ where $\bar{q}=N_{ZC}^{RS} \cdot (u+1)/31$ and $u \in \{0,1,K, 29\}$.

P1-2) For SRS sequence length 72-120:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0,1,K,29\}$, and $v \in \{0,1\}$.

P1-3) For SRS sequence length larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0,1,K,29\}$, and $v \in \{-1,0,1,2\}$.

An alternative of P1-3) For SRS SRS sequence length larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/67$, $u \in \{0,1,K,59\}$, and $v \in \{0,1\}$.

P2: Equal interval between two subsequent roots for any SRS sequence length. In this case, the ZC sequence root q is given by:

P2-1) For SRS sequence length 36-60:

$q=\lfloor \bar{q}+\frac{1}{2} \rfloor$ where $\bar{q}=N_{ZC}^{RS} \cdot (u+1)/31$ and $u \in \{0,1,K, 29\}$.

P2-2) For SRS sequence length 72-120:

$q=\lfloor \bar{q}+\frac{1}{2} \rfloor$ where $\bar{q}=N_{ZC}^{RS} \cdot (u+1)/71$, $u \in \{0,1,K,59\}$.

P2-3) For SRS sequence length larger or equal to 144:

$q=\lfloor \bar{q}+\frac{1}{2} \rfloor$ where $\bar{q}=N_{ZC}^{RS} \cdot (u+1)/139$, $u \in \{0,1,K,119\}$.

where:

$N_{ZC}^{RS}$ is the ZC sequence length (the largest prime number below the SRS sequence length, for example, for SRS sequence length of 60, $N_{ZC}^{RS}$ is 59);

the parameter u is called the sequence group number and the parameter v is called the number within the group;

parameters u and v jointly determines the sequence root q;

the number of roots is determined by u and v, specifically it is the product of number of possible values of u and number of possible values of v;

in solution P2, there is no v, and root q is determined by u.

Note that P1 is a natural extension to LTE root selection: P1-1 and P1-2 provide sets of roots identical to LTE for SRS sequence lengths of 36-60 and 72-120, respectively. Moreover, P1-3 provides a set of 60 roots (a base set of 30 roots and another 30 roots from LTE sequence hopping) identical to LTE for the case that sequence hopping is enabled in addition to 60 other distinct roots derived when v=1 or v=2. In case of P1-3, v can be obtained, for instance, from two consecutive binary digits of the LTE random sequence generator with mapping binary number 11 to −1 (i.e., 00 to 0, 01 to 1, 10 to 2, 11 to −1). For the alternative P1-3, the base root number is 60 and sequence hopping brings another 60 roots. Numbers 71 and 139 in denominators of q expressions in P2-2 and P2-3 are selected as the largest prime numbers less than 72 and 144, respectively. The generation formula of parameters u and v in P2-2 and P2-3 may, for instance, follow that presented in 3GPP TS 36.211 V13.1.0 (2016 March):
Technical Specification,
3rd Generation Partnership Project;
Technical Specification Group Radio Access Network;
Evolved Universal Terrestrial Radio Access (E-UTRA);
Physical channels and modulation (Release 13)
with slight modifications: When the base sequence number is increased from 30 to y=60 or y=120, functions like X mod 30 or $\lfloor x/30 \rfloor$ should be updated accordingly to X mod y or $\lfloor X/y \rfloor$.

For truncated ZC design, a set of roots satisfying PAPR/CM requirements are found by computer search as described previously. A mapping of cell ID or sequence ID to root position can be stored in a table, where root position refers to position within the set of roots found by computer search. An example is shown in Table 2 below where there are M sequence IDs mapped to M root positions.

TABLE 2

| Cell ID or sequence ID | Root position |
| --- | --- |
| Seq_ID_1 | 1 |
| Seq_ID_2 | 2 |
| ... | |
| Seq_ID_M | M |

For a unified design, the same table may be used to determine the mapping for the LTE-like design, with an additional step of mapping to the smaller set of possible roots as described above. The roots for truncated ZC design are also a function of scheduled time, but not a function of sequence length. Group hopping/sequence hopping can be employed, as a function of cell ID or sequence ID, similar to that described above for LTE-like.

For both LTE-like and truncated ZC design, a cyclic shift is also configured, for example using higher layer signaling.

One NR Cell can Employ Multiple Sequence IDs

In accordance with an embodiment of the disclosure, one NR cell can employ multiple sequence IDs→multiple ZC roots. In some embodiments, the roots can be cell specific.

In some embodiments, a group of UEs is assigned one sequence ID to generate a root in which case the root is UE-group specific. For example, a group of geographically proximate UEs or UEs that inflict strong mutual interference can be configured with the same sequence ID (root), but different frequency bands or cyclic shifts.

Coexistence of LTE-Like and Truncated ZC Design in an NR Cell

In some embodiments, LTE-like and truncated ZC sequences are employed in an NR cell. Among the multiple sequence IDs available for use in a given NR cell, some sequence IDs can have LTE-like design, some sequence IDs can have truncated ZC design.

In some embodiments, when low PAPR/CM is more important than scheduling flexibility, SRS may be assigned using LTE-like design, and when scheduling flexibility is more important than low PAPR/CM, SRS may be assigned using truncated ZC design. This provides a tradeoff between PAPR/CM and scheduling flexibility.

In some embodiments, an explicit or implicit signaling is employed to indicate whether LTE-like or truncated ZC design is used for each sequence ID.

Due to the use of multiple roots in an NR Cell, non-orthogonality between different roots exists. In some embodiments, interference mitigation techniques are employed at the network side to improve performance, for example successive interference cancellation.

SRS Bandwidth Configuration

Bandwidth configurations are provide for LTE-like design and for truncated ZC design. In some embodiments, SRS bandwidth configuration is a multiple of a fixed granularity, for example, 4 resource blocks.

In LTE, a cell-specific parameter srs-BandwidthConfig ($C_{SRS}$) determines a set of bandwidth allocations from a tree-like bandwidth configuration structure. A UE-specific parameter srs-Bandwidth ($B_{SRS}$) determines the level of the tree which corresponds to one UE's SRS bandwidth size $m_{SRS}$. A UE-specific parameter freqDomainPosition ($n_{RRC}$) determines the actual SRS bandwidth location. A UE-specific parameter srs-HoppingBandwidth ($b_{hop}$) determines the tree level in which the hopping occurs.

Figure 5:
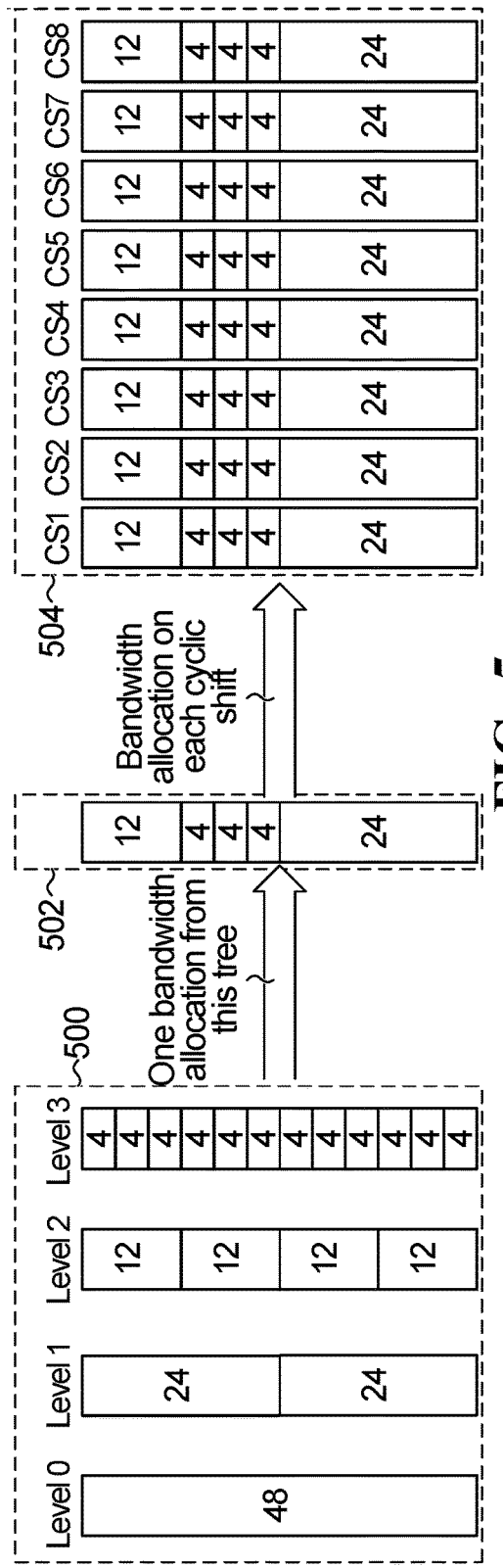
FIG. 5 is an example of a bandwidth tree structure.
Figure 6:
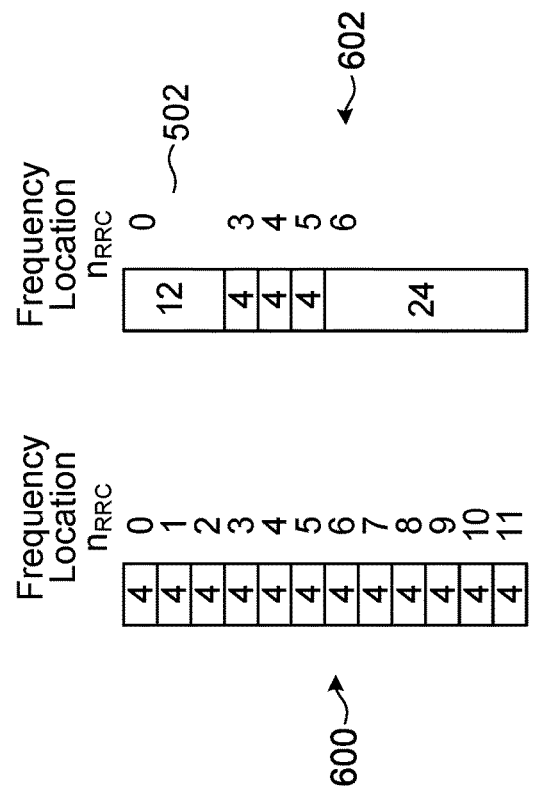
FIG. 6 is an example of UE-specific configuration where $n_{RRC}$ determines the actual sequence bandwidth location.

An example of a specific tree structure is shown in FIG. 5, generally indicated at 500. A given tree structure has a number of levels that each feature bandwidth allocation to a finer granularity. In the example of FIG. 5, the tree has four levels respectively labelled Level=0, 1, 2, 3. Recall that a UE specific configured value $B_{SRS}$ determines the level on such a tree, and sequence bandwidth length $m_{SRS}$. For example, for a UE using the tree structure 500 of FIG. 5, $B_{SRS}=0$ means that an L=48 sequence bandwidth length is employed. For $B_{SRS}=1$, an L=24 sequence bandwidth length is employed. Recall that a UE-specific configured $n_{RRC}$ determines the actual sequence bandwidth location. An example is shown in FIG. 6 which shows the bandwidth allocation 502 of FIG. 5. The frequency locations to the finest possible granularity (level 3 in this example) are indexed with $n_{RRC}$ values 0 to 11. A UE configured with $B_{SRS}=1$ and $n_{RRC}=6$ transmits with a sequence bandwidth length 24 in frequency location 602 depicted in FIG. 6.

In some embodiments, for LTE-like design, SRS frequency hopping takes place in the tree levels above the tree level of the UE. Recall the tree level of the UE can be specified by $B_{SRS}$. Frequency hopping occurs in a tree level indicated by UE specific $b_{hop}<B_{SRS}$. With frequency hopping, during respective time slots, the SRS is transmitted using a frequency band that changes location, for example on a per slot basis, within the UE's bandwidth allocation. Two examples of frequency hopping will be described with reference to FIG. 8. Shown is a bandwidth allocation for cyclic shift 5 that is the same as that depicted in FIG. 7. The bandwidth allocation includes 24 PRB allocation 800 (levels) and two 24 PRB allocations (level 2). A UE with assigned to level 2 of the tree can perform frequency hopping in level 0 or level 1. A first example of hopping in level 1 ($b_{hop}=1$) is indicated at 800, and a second example of hopping in level 0 ($b_{hop}=0$) is indicated at 802.

For example, if a UE is configured with $B_{SRS}=3$, frequency hopping can occur in level 2, 1 or 0 depending on $b_{hop}$. In some embodiments, setting $b_{hop} \geq B_{SRS}$ disables frequency hopping.

Bandwidth Configuration for LTE-Like Design

In NR, within one carrier bandwidth, there might be multiple bandwidth parts (BWP) allocated to different UEs. In one NR Cell, a UE can transmit-receive within its UE-specifically configured UL-DL BWP. So one NR Cell can have multiple BWP which are separated in frequency. Since BWP is UE-specifically configured, in the following text, "one BWP of a cell" means one BWP of a UE in the NR cell. In accordance with an embodiment of the disclosure, for LTE-like SRS design in NR, $C_{SRS}$ is no longer cell-specific as in LTE, and it is UE specific and/or may also be BWP-specifically configured, i.e., a NR Cell configures one $C_{SRS}$ for each BWP in an LTE-like design. In some embodiments multiple UEs configured to use the same BWP are constrained to be configured with the same $C_{SRS}$. The $C_{SRS}$ of each UE on each BWP may be sent to the UE through RRC signaling when it updates semi-statically. After $C_{SRS}$ is updated, the corresponding $B_{SRS}$, $n_{RRC}$, and $b_{hop}$ are updated and signaled to the UE for the new $C_{SRS}$.

Whereas LTE has 8 possible $C_{SRS}$ values per cell, NR with larger SRS bandwidth may have the same or more available $C_{SRS}$ values to select from for one tree. More generally, a parameter can be signaled to UE, the parameter having equal to or greater than 8 possible values for a cell or a group of UEs with a same ZC sequence, indicating a corresponding equal to or greater than 8 possible tree-like bandwidth allocation structures.

Actual bandwidth allocation is one instance of this set/tree. Referring to FIG. 5, an example of an actual allocation based on tree 500 is indicated at 502. This resource allocation can be employed for each of the possible set of cyclic shifts. The bandwidth allocation is the same for each cyclic shift. An example set of bandwidth allocations for 8 cyclic shifts CS1, . . . , CS8 is indicated at 504.

In some embodiments, whereas LTE has 4 possible $B_{SRS}$/$m_{SRS}$ values to select from, for NR with a larger SRS bandwidth, there are the same or more UE-specific $B_{SRS}$/$m_{SRS}$ values to select from.

Bandwidth Configuration for Truncated ZC Design

A configurable $C_{SRS}$ determines a tree structure to be used for bandwidth allocation from a set of possible tree structures. More generally, a parameter can be signaled to UE, the parameter having equal to or greater than 8 possible values for a cell or a group of UEs with a same ZC sequence, indicating a corresponding equal to or greater than 8 possible tree-like bandwidth allocation structures. In some embodiments, bandwidth allocation of one BWP of a cell for truncated ZC is based on only one LTE-like tree structure of bandwidth allocations. In some embodiments, for truncated ZC design, bandwidth allocations of one BWP of a cell can be multiple LTE-like tree structures in which case multiple $C_{SRS}$ are configured for example for a BWP of a cell.

There may be partial overlapping between bands of these trees. Steps can be taken to keep orthogonality, detailed below. This approach provides more per-UE bandwidth options and higher granularity to accommodate different types of UE (cell-edge/cell-center).

Figure 7:
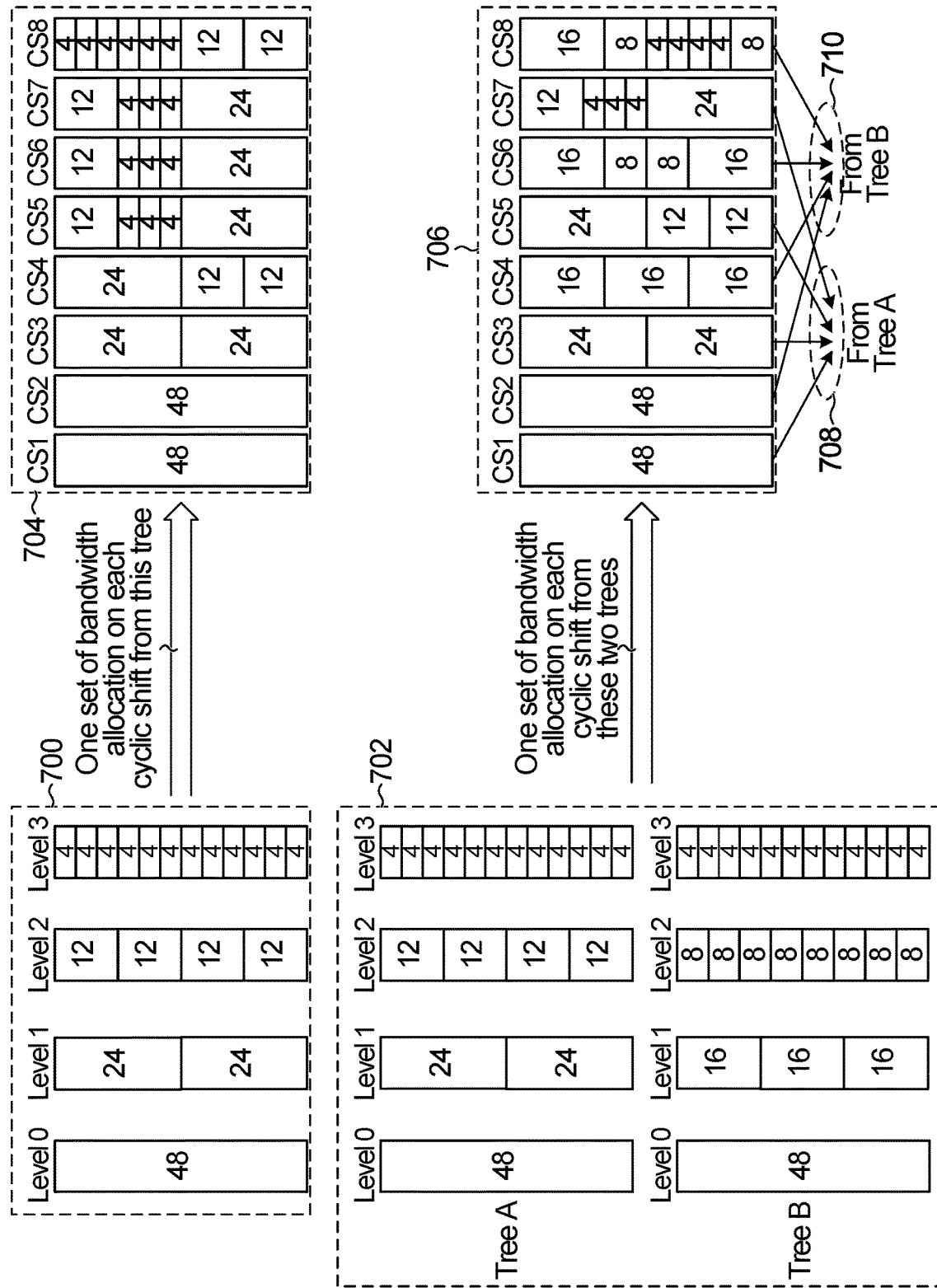
FIG. 7 shows an example where a single LTE-like tree is configured for truncated ZC design.

FIG. 7 shows a first example, generally indicated at 700, where a single LTE-like tree is configured for truncated ZC design. Also shown is a second example, generally indicated at 702, where two LTE-like trees are configured for truncated ZC design, indicated as Tree A and Tree B. For this example, the per-UE bandwidth options are [4, 12, 24, 48] with only one tree while more options of [4, 8, 12, 16, 24, 48] are supported with two trees.

An actual bandwidth allocation is a set of instances of these trees. For the tree 700, shown are allocations for 8 cyclic shifts indicated at 704. This subset can have full duplications (for example the bandwidth allocations for CS1, CS2, or the bandwidth allocations for CS5, CS6, CS7), partial duplications, or no duplications. The bandwidth allocations for different cyclic shifts can overlap partially with each other.

For the combination of trees 702, shown are allocations for 8 cyclic shifts indicated at 706. These include some allocations 708 from Tree A, and some allocations 710 from Tree B.

Figure 8:
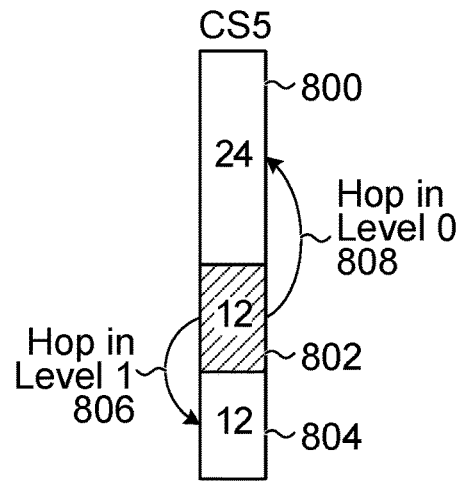
FIG. 8 is an example of frequency hopping in level 0 or level 1.

Alternatively, or in addition, a different design that does not follow an LTE-like tree structure is employed subject to guaranteeing partial-overlapping orthogonality as detailed below. An example is shown in FIG. 8, which shows LTE-like tree structures 800,802, and a structure 804 that does not follow an LTE-like tree.

For the case where UE-specific configuration for truncated ZC design following an LTE tree structure is employed, a UE specific configured $B_{SRS}$ determines the level on one tree and sequence bandwidth length $m_{SRS}$, and UE-specific configured $n_{RRC}$ determines actual bandwidth allocation for one tree, and UE-specifically configured $b_{hop}$ determines the tree level on which frequency hopping occurs.

In some embodiments, where bandwidth allocation of one sequence ID does not follow an LTE-like tree structure, frequency hopping location can be configured using higher layer signalling for each hop.

In some embodiments, where bandwidth allocation of one sequence ID does not follow an LTE-like tree structure, the sequence length of for a UE may change from one hop to another, at least some of the time.

In some embodiments, in one BWP of one cell, the set of bandwidth allocations are from multiple trees. In this case, there are multiple $C_{SRS}$ in a BWP of a cell each associated with a respective one of the multiple trees. However, in some embodiments, each UE is configured to use only one of the multiple trees on one of its BWP. A UE in one tree can be semi-statically configured to another tree.

In this embodiment, $C_{SRS}$ is UE-specific (in contrast to LTE where it is cell-specific). The used $C_{SRS}$ may be sent to the UE through RRC signaling when it updates semi-statically. After $C_{SRS}$ is updated, the corresponding $B_{SRS}$, $n_{RRC}$, and $b_{hop}$ are updated and signaled to the UE for the new $C_{SRS}$.

For the case where bandwidth allocation for the ZC design does not follow LTE tree structure, the srs-BandwidthConfig ($C_{SRS}$) which specifies a tree structure is no longer needed. A tree level UE-specific parameter $B_{SRS}$ is no longer an index of tree level e.g., [0, 1, 2, 3] as in LTE. This parameter (or some other parameter) can be used to directly indicate the bandwidth size $m_{SRS}$. As before, a UE-specific $n_{RRC}$ is an index corresponding to sequence frequency location. A UE frequency hopping related signaling $b_{hop}$ should be revised such that it does not indicate tree level any more, instead it specifies the frequency location in each hop.

The following is a specific example of signaling for non-tree structure bandwidth configuration:

A UE-specific parameter to directly indicate the bandwidth size $M_{SRS}(\ )$

A UE-specific parameter to indicate the frequency location of each hop for frequency hopping In a first example, signaling indicates the frequency location offset between two hops, e.g., if this offset is 5, then in $1^{st}$ hop the starting location of SRS in frequency is nth RB, in $2^{nd}$ hop the starting location of SRS frequency is (n+5)th RB In a second example, the signaling is an index of some pre-computed vector of frequency starting index, e.g., if it is an index corresponding to [5, 1, 3, 9, 7], then it means the frequency starting position of $1^{st}$ hop is $5^{th}$ RB, and frequency starting position of $2^{nd}$ hop is $1^{st}$ RB, and so on.

In some embodiments, one of the above two signaling examples is used to replace LTE signaling $B_{SRS}$ and $b_{hop}$, and LTE signaling $C_{SRS}$ for tree configuration no longer exists. Another signaling is $n_{RRC}$, which can be the same as LTE.

In some embodiments, a hybrid approach is adopted, in which both tree structure and non-tree structure are used for one cell or one group of UEs with the same sequence ID.

For UEs to use the tree-based approach, the UE is configured with UE-specific parameters $C_{SRS}$, $B_{SRS}$, $n_{RRC}$, $b_{hop}$ for example as described above. For UEs to use a non-tree based approach, the UE is configured with UE-specific parameters $B_{SRS}$, $n_{RRC}$, and $b_{hop}$. An additional indication (either indicated explicitly as further signaling, e.g., signal one bit or via setting a special value for $C_{SRS}$, or implicitly) conveys the fact that the parameters $B_{SRS}$, $n_{RRC}$, and $b_{hop}$ are in respect of "non-tree" bandwidth allocation.

Partial Overlapped Bandwidth Granularity
Truncated ZC Design

Although flexibility of scheduling is achieved via truncated ZC design, in some embodiments, due to different UE capabilities, constraints on the granularity of (partial) overlapped bandwidth are imposed to ensure orthogonality. Where a first bandwidth is used for sequence A, and a second bandwidth is used for sequence B, where bandwidth A overlaps partially, but not completely with bandwidth B, there is a partial overlap. The length of the sequence occupying the bandwidth overlap is referred to herein as overlapped sequence length.

For the case where SRS bandwidth allocation is in multiples of 4 RBs, for a total of X (e.g., X=8 or X=12) cyclic shifts, to ensure orthogonality, (partial) overlapped sequence length should be a multiple of:

X, when mother sequence generation is a function of comb (case 1). For case 1, one mother sequence is generated for each comb; and if there are two combs, two mother sequences are generated.

X/comb_size, when mother sequence generation is independent of comb (case 2). For case 2, only one mother sequence is generated for all combs. And the mother sequence for each comb can be truncated from this single large mother sequence.

Example 1: 8 Cyclic Shifts, Comb Size 2

Case 1: (partial) overlapped bandwidth should be a multiple of 4 RB (48/2=8*3). For this example, 1 RB has 12 subcarriers, so 4 RBs have 48 subcarriers 48 divided by (comb size of) 2, is the SRS sequence length of 24, which is 3 times 8 (there are X=8 cyclic shifts).
Case 2: (partial) overlapped bandwidth should be a multiple of 2 RB (24/2=8/2*3)

Example 2: 8 Cyclic Shifts, Comb Size 4

Case 1: (partial) overlapped bandwidth should be a multiple of 8 RB (96/4=8*3)
Case 2: (partial) overlapped bandwidth should be a multiple of 2 RB (24/4=8/4*3)

Example 3: 12 Cyclic Shifts, Comb Size 2

Case 1: (partial) overlapped bandwidth should be a multiple of 2 RB (24/2=12*1)
Case 2: (partial) overlapped bandwidth should be a multiple of 1 RB (12/2=12/2*1)
12 cyclic shifts, comb size 4

Example 4: 12 Cyclic Shifts, Comb Size 4

Case 1: (partial) overlapped bandwidth should be a multiple of 4 RB (48/4=12*1)
Case 2: (partial) overlapped bandwidth should be a multiple of 1 RB (12/4=12/4*1)

Similar multiples can be defined for any number of cyclic shifts and comb sizes, and in particular for cases where X/comb size is an integer.

In some embodiments, two cases (comb size 2+8 cyclic shifts, comb size 4+12 cyclic shifts) are implemented. Optionally, a granularity of 4 RB for partial overlapped size can be chosen for case 1; while a granularity of 2 RB for partial overlapped size can be chosen for case 2.

The above detailed constraint on partial overlap to ensure orthogonality may place some constraints on the tree-structure and non-tree-structure bandwidth configuration.

The examples have assumed a 4 RB granularity for SRS bandwidth as in LTE, but the same approach can be used for other granularities, for example 1 RB.

Embodiments have been described featuring bandwidth configuration following an LTE-like tree structure, with multiple trees per BWP of a cell. Due to the partial overlap granularity requirement described above, not all tree structures can be used simultaneously for each BWP of a cell under truncated ZC design while still ensuring orthogonality. In some embodiments, only tree structures that guarantee that any partial overlapped band satisfies the required multiple as described above are allowed to be used simultaneously.

Figure 9:
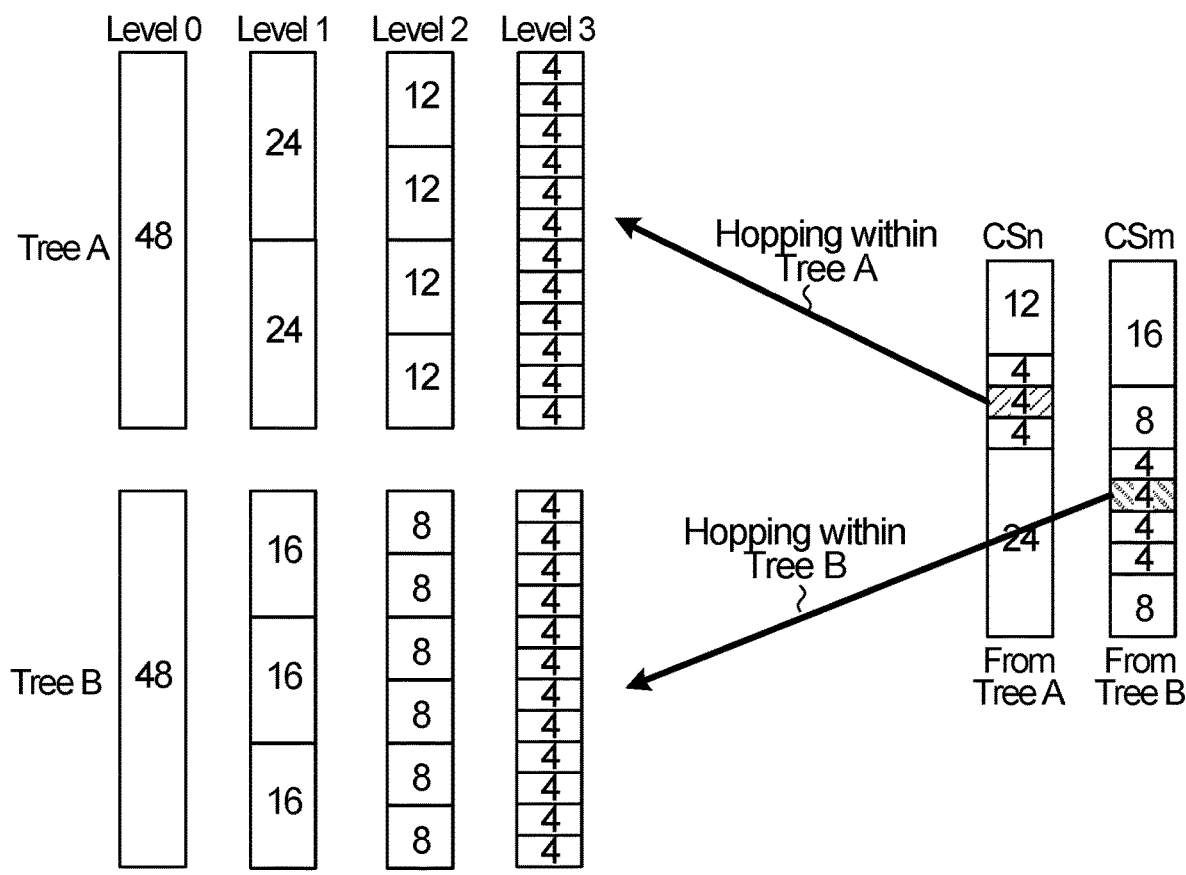
FIG. 9 shows an example where only tree structures that guarantee that any partial overlapped band satisfies the required multiple as described above are allowed to be used simultaneously.

An example will be described with reference to FIG. 9 which shows two tree structures Tree A 900 and Tree B 902. Under case 1 (mother sequence generation is a function of comb), for (8 cyclic shifts, comb size 2) or (12 cyclic shifts, comb size 4), the two trees 900,902 cannot be used at the same time for one BWP of a cell. This is because the partial overlap bandwidth is 6 RB between bandwidth size 12 in Tree A and bandwidth size 20 in Tree B, which is not a multiple of 4 RBs as required for this situation as detailed above.

Where bandwidth configuration does not follow a tree structure, partial overlapping orthogonality can be ensured by requiring that the overlapped band satisfies the required multiple of the RBs as detailed above.

Truncated ZC Design
SRS Hopping and Antenna Switching

In some embodiments, SRS frequency hopping is combined with antenna switching. Antenna switching in the most general sense means switching the antenna or antennas used to transmit the SRS. For example, for a UE with two antennas, the UE can transmit SRS on different antenna ports in different time (TDM) to enable the network to measure the channel on these two antenna ports.

In a first option for combined SRS hopping and antenna switching, SRS frequency hopping takes place at the slot level (in NR, a slot is defined as 7 or 14 OFDM symbols but other slot definitions can be used) i.e., SRS transmits on this frequency band in this slot, and transmits on another frequency band in another slot), and SRS antenna switching takes place at the symbol level (i.e., SRS transmits on one antenna port in one symbol, and transmits on another antenna port in another symbol). Consideration should be given to the time-gap between consecutive symbols to ensure that hardware switching time can accommodate the antenna switch.

In a second option for combined SRS hopping and antenna switching, SRS frequency hopping takes place at the symbol-level, and SRS antenna switching takes place at the slot-level. A benefit of this option compared to the first option is that that there is no need for gap to accommodate hardware switching time between antenna ports.

Relevant Signaling

The following is a specific example of signaling that can be employed to implement the above described embodiments.

LTE like in NR:
LTE-like in NR UE-specific or BWP-specific: $C_{SRS}$
UE-specific: $B_{SRS}$, $n_{RRC}$, $b_{hop}$ Truncated design in NR:
UE-specific (with or without sequence ID): $C_{SRS}$ (if multiple tree structures are allowed in one BWP then it is UE-specific, otherwise it can be UE-specific or BWP-specific), $B_{SRS}$, $n_{RRC}$, $b_{hop}$.

In either case, if $C_{SRS}$ is BWP-specific, it may be signaled in a broadcast channel, for example in a system information block such as SIB2, or it can be signaled using RRC signaling; if $C_{SRS}$ is UE-specific, it may be signaled using RRC signaling. The other parameters may be configured via RRC signaling.

Figure 10A:
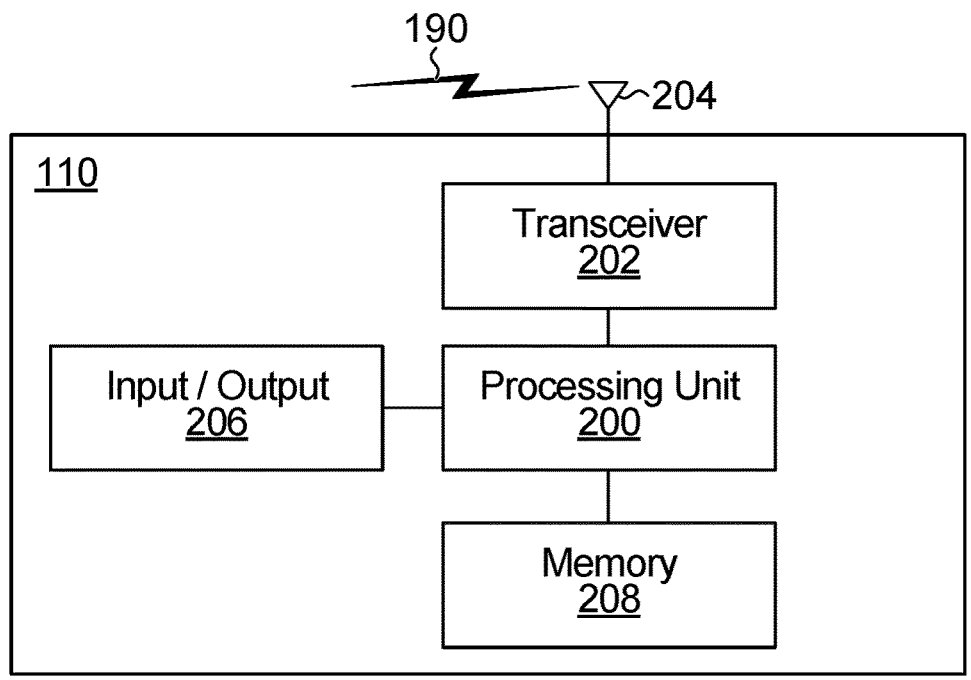
FIG. 10A is a block diagram of an example electronic device that may implement one or more of the embodiments described herein.
Figure 10B:
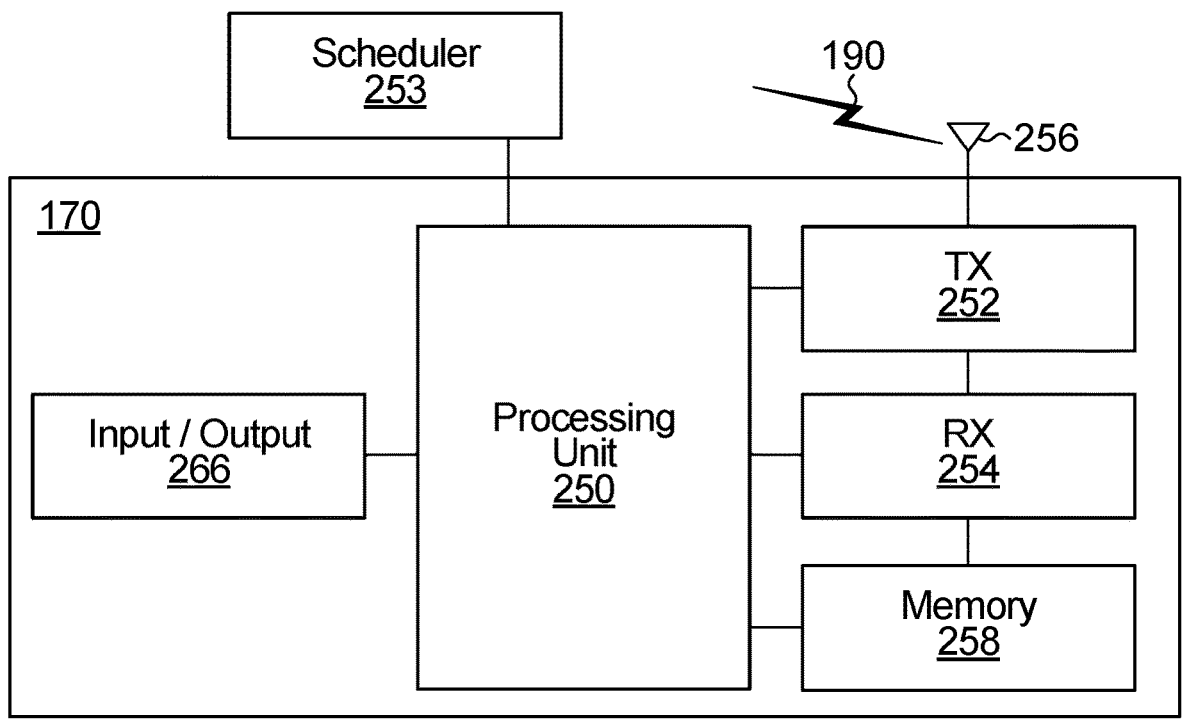
FIG. 10B is a block diagram of an example base station that may implement one or more of the embodiments described herein.

FIGS. 10A and 10B illustrate example devices that may implement the methods and teachings according to this disclosure. In particular, FIG. 10A illustrates an example ED 110, and FIG. 10B illustrates an example base station 170. These components could be used in the system 100 or in any other suitable system.

As shown in FIG. 10A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless transmission and/or processing signals received wirelessly or by wire. Each antenna 204 includes any suitable structure for transmitting and/or receiving wireless signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces. The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like As shown in FIG. 10B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 facilitates interaction with a user or other devices (network communications) in the network. Each input/output device 266 includes any suitable structure for providing information to or receiving/providing information from a user, including network interface communications.

According to another broad aspect of the disclosure, a method is provided comprising transmitting signalling to configure a UE with a UE specific root to use in generating a Zhadoff Chu (ZC) sequence for reference signal transmission.

Optionally, the method further comprises selecting the UE specific root for the UE from a set of roots containing greater than 60 roots. An advantage of increasing the number of roots is to maintain re-use distance in dense deployment scenarios Optionally, the method further comprises selecting the UE specific root for the UE from a set of roots wherein the size of the set of roots is a function of ZC sequence length, and for at least one ZC sequence length, the size of the set of roots is greater than 60.

Optionally, the size of the set of roots is in accordance with:

| Sequence length | Number of roots |
| --- | --- |
| 36 to 60 | 30 |
| 72 to $L_1$ | 60 |
| $L_2$ to $L_3$ | $F_2(L_2)$ |
| ... | ... |
| $L_{n-1}$ to $L_n$ | $F_{n-1}(L_{n-1})$ | where the function $F_n(L_n)$ value is not larger than the available number of roots for a sequence length $L_n$.

Optionally, the size of the set of roots is in accordance with:

| | length | | |
| --- | --- | --- | --- |
| | 36-60 | 72-120 | 144 and above |
| Max #Roots | 30 | 60 | 120 |

Optionally, the size of the set of roots is in accordance with:

| | ZC Length | | | |
| --- | --- | --- | --- | --- |
| | 36-60 | 72-96 | 108-120 | 144 and above |
| Max #Roots | 30 | 60 | 90 | 120 |

Optionally, the size of the set of roots is in accordance with:

| | ZC length | | |
| --- | --- | --- | --- |
| | 36-60 | 72-96 | 108 and above |
| Max #Roots | 30 | 60 | 90 |

Optionally, for any of the above described embodiments, the roots are in accordance with one of the formulas in the section of the description entitled R1-1712239.

Optionally, for any of the above described embodiments, the set of roots containing greater than 60 roots comprise a first set of N roots roughly uniformly placed over a ZC sequence length, with sequence hopping to generate additional roots.

Optionally, for any of the above described embodiments, the set of roots containing greater than 60 roots comprise a roots roughly uniformly placed over a ZC sequence length.

Optionally, for any of the above described embodiments, the method further comprises configuring at least one UE with a full length ZC sequence and another UE with a truncated ZC sequence in the same cell.

Optionally, the method further comprises using a unified method for sequence root generation for both full length ZC sequences and truncated ZC sequences. By using a unified method, a simplified implementation can be achieved compared to needing to implement two different methods.

Optionally, the unified method comprises: using roots for truncated ZC sequence based on results of a computer search; using roots for full length ZC sequence transmission based on a mapping of the roots selected for truncated ZC design proportionally to each full length ZC sequence length.

Optionally, for any of the above described embodiments, the method further comprises generating roots for full length ZC sequences using either of the following methods P1 and P2 to generate ZC root for each SRS sequence length.

P1: Similar root selection principle as in LTE using sequence hopping for sequence length larger than 60. In this case, ZC sequence root q is given by (corresponding to root number distribution the second example above, repeated here):

| | length | | |
| --- | --- | --- | --- |
| | 36-60 | 72-120 | 144 and above |
| Max #Roots | 30 | 60 | 120 |

For SRS sequence length 36-60:

$q=\lfloor \bar{q}+\frac{1}{2} \rfloor$ where $\bar{q}=N_{ZC}^{RS} \cdot (u+1)/31$ and $u \in \{0,1,K,29\}$.

P1-1) For SRS sequence length 72-120:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0,1,K,29\}$, and $v \in \{0,1\}$.

P1-2) For SRS sequence length larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0,1,K,29\}$ and $v \in \{-1,0,1,2\}$.

An alternative of P1-3) For SRS SRS sequence length larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/67$, $u \in \{0,1,K,59\}$, and $v \in \{0,1\}$.

P2: Equal interval between two subsequent roots for any SRS sequence length. In this case, the ZC sequence root q is given by:

P2-1) For SRS sequence length 36-60:

$q=\lfloor \bar{q}+\frac{1}{2} \rfloor$ where $\bar{q}=N_{ZC}^{RS} \cdot (u+1)/31$ and $u \in \{0,1,K,29\}$.

P2-2) For SRS sequence length 72-120:

$q=\lfloor \bar{q}+\frac{1}{2} \rfloor$ where $\bar{q}=N_{ZC}^{RS} \cdot (u+1)/71$, $u \in \{0,1,K,59\}$.

P2-3) For SRS sequence length larger or equal to 144:

$q=\lfloor \bar{q}+\frac{1}{2} \rfloor$ where $\bar{q}=N_{ZC}^{RS} \cdot (u+1)/139$, $u \in \{0,1,K,119\}$.

where:

where $N_{ZC}^{RS}$ is the ZC sequence length (the largest prime number below the SRS sequence length, for example, for SRS sequence length of 60, $N_{ZC}^{RS}$ is 59);

the parameter u is called the sequence group number and the parameter v is called the number within the group; and parameter u and v jointly determines the sequence root q;

the number of roots is determined by u and v, specifically it is the product of the number of possible values of u and the number of possible values of v;

in solution P2, there is no v, and root q is determined by u.

Optionally, any of the above described embodiments further comprises maintaining a table mapping sequence ID to root position, where root position refers to a position within a set of roots found by computer search.

Optionally, for any of the above described embodiments, the method further comprises for truncated ZC design, configuring a UE with UE-specific parameter indicating a tree-like bandwidth allocation structure to use for bandwidth allocation.

Optionally, for any of the above described embodiments, the method further comprises for truncated ZC design, configuring a UE with UE-specific parameter or bandwidth part specific parameter indicating a tree-like bandwidth allocation structure to use for bandwidth allocation.

Optionally, for any of the above described embodiments, the method further comprising for a full length ZC sequence, configuring a UE with a UE-specific or bandwidth part specific parameter indicating a tree-like bandwidth allocation structure to use for bandwidth allocation.

Optionally, two UEs in a cell using the same bandwidth part are configured with the same parameter indicating a tree-like bandwidth allocation structure to use for bandwidth allocation. This implies bandwidth-part (BWP) specific reference symbol configuration: different UEs in a BWP have the same configuration.

Optionally, the parameter has equal to or greater than 8 possible values for a cell or a group of UEs with a same ZC sequence, indicating a corresponding equal to or greater than 8 possible tree-like bandwidth allocation structures. An advantage of a larger number of tree-structures is more flexible SRS bandwidth allocation, and larger granularity for SRS band size. More possible SRS band sizes means the UE can have more options for power spectrum density of SRS for different pathloss scenarios.

Optionally, for any of the above described embodiments, the method further comprises configuring the UE with an indication of a level of the tree-like bandwidth allocation structure which corresponds to the UEs sounding reference signal bandwidth size.

Optionally, the indication can have one of a set of equal to or greater than 4 possible values for a tree-like bandwidth allocation structure. More possible bandwidth sizes means the UE can have more options for power spectrum density of SRS for different pathloss scenarios.

Optionally, for any of the above described embodiments, the method further comprises configuring a UE to use truncated ZC sequence for sounding reference signal transmission; performing a bandwidth allocation for reference signal transmission based on tree-like bandwidth allocation structures.

Optionally, performing a bandwidth allocation for reference signal transmission based on tree-like bandwidth allocation structures comprises using multiple tree-like bandwidth allocation structures simultaneously in one bandwidth part. Allocation using multiple tree-like bandwidth allocation structures means for each UE, it can have more options for bandwidth size, and hence more options for power spectrum density to accommodate more pathloss scenarios.

Optionally, for any of the above described embodiments, the method further comprising configuring a UE to use truncated ZC sequence for sounding reference signal transmission; performing a bandwidth allocation for reference signal transmission that is not based on a tree-like bandwidth allocation structure, and using higher layer signalling to indicate a bandwidth allocation. This provides more flexibility in bandwidth configuration.

Optionally, for any of the above described embodiments, the method further comprises: configuring a UE to use a truncated ZC sequence for sounding reference signal transmission, with frequency hopping; configuring the ZC sequence length to change from one hop to another, at least some of the time, if non-tree-like bandwidth allocation structure of bandwidth configuration is used; configuring the ZC sequence frequency location in each hop, if non-tree-like bandwidth allocation structure of bandwidth configuration is used.

Optionally, for any of the above described embodiments, the method further comprises for truncated ZC design, using bandwidth allocation based on tree-like bandwidth allocation structures and based on non-tree-like bandwidth allocation structures for a group of UEs with the same sequence ID.

Optionally, for any of the above described embodiments, the method further comprises performing bandwidth allocation for sounding reference signal transmission using truncated ZC sequences, subject to a constraint on overlapped bandwidth to ensure orthogonality.

Optionally, bandwidth allocation is performed using multiple tree-like bandwidth allocation structures that satisfy the constraint.

Optionally, bandwidth allocation is performed at least one non-tree-like bandwidth allocation structure that satisfy the constraint.

Optionally, for any of the above described embodiments, the method further comprises combining sounding reference signal frequency hopping and antenna switching.

Optionally, for any of the above described embodiments, antenna switching takes place at a slot level (between adjacent SRS slots), and sounding reference signal frequency hopping takes place at a symbol level (between adjacent SRS symbols within a slot). Optionally, for any of the above described embodiments, antenna switching takes place at a symbol level, and sounding reference signal frequency hopping takes place at a slot level.

The advantage of SRS frequency hopping at the symbol level and antenna switching at slot level is there is no need for some time gaps to accommodate hardware switching time between antenna ports. Slot level antenna switching may require a longer time interval between two antenna switching. With SRS frequency hopping at the slot level and antenna switching at symbol level, some gaps may be needed between two consecutive symbols for hardware switching time.

Optionally, for any of the above described embodiments, the method further comprises receiving a sounding reference signal in accordance with the configuration.

According to another aspect of the present disclosure, there is provided a method in a user equipment (UE) comprising: receiving signalling to configure the UE with a UE specific root to use in generating a Zadoff Chu (ZC) sequence for reference signal transmission; transmitting a reference signal in accordance with the received configuration.

Optionally, the UE specific root for the UE is selected from a set of roots containing greater than 60 roots.

Optionally, the UE specific root for the UE is selected from a set of roots wherein the size of the set of roots is a function of ZC sequence length, and for at least one ZC sequence length, the size of the set of roots is greater than 60.

Optionally, the size of the set of roots is in accordance with:

| Sequence length | Number of roots |
| --- | --- |
| 36 to 60 | 30 |
| 72 to L1 | 60 |
| $L_2$ to $L_3$ | $F_2(L_2)$ |
| ... | ... |
| $L_{n-1}$ to $L_n$ | $F_{n-1}(L_{n-1})$ | where the function $F_n(L_n)$ value is not larger than the available number of roots for a sequence length $L_n$.

Optionally, the size of the set of roots is in accordance with:

| | ZC length | | |
| --- | --- | --- | --- |
| | 36-60 | 72-120 | 144 and above |
| Max #Roots | 30 | 60 | 120 |

Optionally, the size of the set of roots is in accordance with:

| | ZC Length | | | |
| --- | --- | --- | --- | --- |
| | 36-30 | 72-96 | 108-120 | 144 and above |
| Max #Roots | 30 | 60 | 90 | 120 |

Optionally, the size of the set of roots is in accordance with:

| | ZC length | | |
| --- | --- | --- | --- |
| | 36-60 | 72-96 | 108 and above |
| Max #Roots | 30 | 60 | 90 |

Optionally, the set of roots containing greater than 60 roots comprise a first set of N roots roughly uniformly placed over a ZC sequence length, with sequence hopping to generate additional roots.

Optionally the set of roots containing greater than 60 roots comprises roots roughly uniformly placed over a ZC sequence length without sequence hopping.

Optionally, at least one UE is configured with a full length ZC sequence and another UE is configured with a truncated ZC sequence in a same cell.

Optionally, the method further comprises using a unified method for sequence root generation for both full length ZC sequences and truncated ZC sequences.

Optionally, the unified method comprises: using roots for truncated ZC sequence based on results of a computer search; using roots for full length ZC sequence transmission based on a mapping of the roots selected for truncated ZC design proportionally to each full length ZC sequence length.

Optionally, roots for full length ZC sequences are generated using either of the following methods P1 and P2 to generate ZC roots for each SRS sequence length.

P1-1) For SRS sequence length 36-60:

$q = \lfloor \bar{q} + 1/2 \rfloor$ where $\bar{q} = N_{ZC}^{RS} \cdot (u+1)/31$ and $u \in \{0,1,K,29\}$.

P1-2) For SRS sequence length 72-120:

$q = \lfloor \bar{q} + 1/2 \rfloor + v \cdot (-1)^{\lfloor 2\bar{q} \rfloor}$ where $\bar{q} = N_{ZC}^{RS} \cdot (u+1)/31$, $u \in \{0,1,K,29\}$, and $v \in \{0,1\}$.

P1-3 For SRS sequence length larger or equal to 144:

$q = \lfloor \bar{q} + 1/2 \rfloor + v \cdot (-1)^{\lfloor 2\bar{q} \rfloor}$ where $\bar{q} = N_{ZC}^{RS} \cdot (u+1)/31$, $u \in \{0,1,K,29\}$, and $v \in \{-1,0,1,2\}$.

OR

P1-3) For SRS SRS sequence length larger or equal to 144:

$q = \lfloor \bar{q} + 1/2 \rfloor + v \cdot (-1)^{\lfloor 2\bar{q} \rfloor}$ where $\bar{q} = N_{ZC}^{RS} \cdot (u+1)/67$, $u \in \{0,1,K,59\}$, and $v \in \{0,1\}$.

P2-1) For SRS sequence length 36-60:

$q = \lfloor \bar{q} + 1/2 \rfloor$ where $\bar{q} = N_{ZC}^{RS} \cdot (u+1)/31$ and $u \in \{0,1,K,29\}$.

P2-2) For SRS sequence length 72-120:

$q = \lfloor \bar{q} + 1/2 \rfloor$ where $\bar{q} = N_{ZC}^{RS} \cdot (u+1)/71$, $u \in \{0,1,K,59\}$.

P2-3) For SRS sequence length larger or equal to 144:

$q = \lfloor \bar{q} + 1/2 \rfloor$ where $\bar{q} = N_{ZC}^{RS} \cdot (u+1)/139$, $u \in \{0,1,K,119\}$ where:

$N_{ZC}^{RS}$ is the ZC sequence length (the largest prime number below the SRS sequence length, for example, for SRS sequence length of 60, $N_{ZC}^{RS}$ is 59);

the parameter u is called the sequence group number and the parameter v is called the number within the group; parameters u and v jointly determines the sequence root q;

the number of roots is determined by u and v, specifically it is the product of number of possible values of u and number of possible values of v;

In solution P2, there is no v, and root q is determined by u.

Optionally, the method further comprises maintaining a table mapping sequence ID to root position, where root position refers to an index within a set of roots found by computer search.

Optionally, the method further comprises: for truncated ZC design, receiving signaling to configure a UE-specific or bandwidth-specific parameter indicating a tree-like bandwidth allocation structure to use for bandwidth allocation for reference signal transmission.

Optionally, the method further comprises: for a full length ZC sequence, receiving signaling to configure a UE-specific or bandwidth part specific parameter indicating a tree-like bandwidth allocation structure to use for bandwidth allocation for reference signal transmission.

Optionally, two UEs in a cell using the same bandwidth part are configured with the same parameter indicating a tree-like bandwidth allocation structure to use for bandwidth allocation for reference signal transmission.

Optionally, the parameter has equal to or greater than 8 possible values for a cell or a group of UEs with the same sequence ID indicating a corresponding equal to or greater than 8 possible tree-like bandwidth allocation structures.

Optionally, the method further comprises: receiving signaling to configure of an indication of a level of the tree-like bandwidth allocation structure which corresponds to the size of a bandwidth allocation for reference signal transmission.

Optionally, the indication has one of a set 4 or more possible values for a tree-like bandwidth allocation structure.

Optionally, the method further comprises: receiving signaling to configure the UE to use a truncated ZC sequence for sounding reference signal transmission; receiving signaling of a bandwidth allocation for reference signal transmission based on tree-like bandwidth allocation structures.

Optionally, the bandwidth allocation for reference signal transmission based on tree-like bandwidth allocation structures uses multiple tree-like bandwidth allocation structures simultaneously in one bandwidth part.

Optionally, the method further comprises: receiving signaling to configure the UE to use a truncated ZC sequence for sounding reference signal transmission; receiving higher signalling of a bandwidth allocation for reference signal transmission that is not based on a tree-like bandwidth allocation structure.

Optionally, the method further comprises: receiving signaling to configure the UE to use a truncated ZC sequence for sounding reference signal transmission, with frequency hopping; receiving signaling instructing the UE to change the ZC sequence from one hop to another, at least some of the time; receiving signaling indicating of ZC sequence frequency location in each hop.

Optionally, the method further comprises receiving signaling of a bandwidth allocation for sounding reference signal transmission using truncated ZC sequences, subject to a constraint on overlapped bandwidth to ensure orthogonality.

Optionally, bandwidth allocation is performed using multiple tree-like bandwidth allocation structures that satisfy the constraint.

Optionally, bandwidth allocation is performed using at least one non-tree-like bandwidth allocation structure that satisfies the constraint.

Optionally, the method further comprises combining sounding reference signal frequency hopping and antenna switching.

Optionally antenna switching takes place at a slot level, and sounding reference signal frequency hopping takes place at a symbol level.

Optionally, antenna switching takes place at a symbol level, and sounding reference signal frequency hopping takes place at a slot level.

Optionally, the method further comprises transmitting a sounding reference signal in accordance with the configuration.

According to another aspect of the present disclosure, there is provided a base station configured to perform the actions according to the method embodiments as discussed above.

According to another aspect of the present disclosure, there is provided a user equipment (UE) configured to perform the actions according to the method embodiments as discussed above.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method comprising:
transmitting, by a base station, signalling to a plurality of user equipments (UEs) to configure each of the plurality of UEs with a respective UE specific root to use in generating a Zadoff Chu (ZC) sequence for reference signal transmission, the UE specific root for each UE of the plurality of UEs being different than the UE specific root for at least one other UE of the plurality of UEs, the UE specific root for each UE of the plurality of UEs being selected from a set of roots wherein the size of the set of roots is a function of ZC sequence length, and for at least one ZC sequence length, the size of the set of roots is greater than 60; and
receiving, by the base station, a respective reference signal from each of at least one of the plurality of UEs, the respective reference signal based on a ZC sequence generated using the UE specific root for that UE.

2. The method of claim 1 further comprising selecting the UE specific root for each of plurality of the UEs from a set of roots containing greater than 60 roots.

3. The method of claim 2 wherein the set of roots containing greater than 60 roots comprises roots roughly uniformly placed over a ZC sequence length without sequence hopping.

4. The method of claim 1 wherein the size of the set of roots is in accordance with:

| Sequence length | Number of roots |
|---|---|
| 36 to 60 | 30 |
| 72 to $L_1$ | 60 |
| $L_2$ to $L_3$ | $F_2(L_2)$ |
| ... | ... |
| $L_{n-1}$ to $L_n$ | $F_{n-1}(L_{n-1})$ | where the function $F_n(L_n)$ value is not larger than the available number of roots for a sequence length $L_n$.

5. The method of claim 1 wherein the size of the set of roots is in accordance with:

| | ZC length | | |
|---|---|---|---|
| | 36-60 | 72-120 | 144 and above |
| Max #Roots | 30 | 60 | 120. |

6. The method of claim 1 further comprising generating roots for full length ZC sequences for each SRS sequence length according to:

if SRS sequence length is between 36-60:
$q=\lfloor \bar{q}+\frac{1}{2} \rfloor$ where $\bar{q}=N_{ZC}^{RS} \cdot (u+1)/31$ and $u \in \{0, 1, \ldots, 29\}$;

if SRS sequence length is between 72-120:
$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0, 1, \ldots, 29\}$, and $v \in \{0,1\}$;

if SRS sequence length is larger or equal to 144:
$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0, 1, \ldots, 29\}$; OR if SRS sequence length is larger or equal to 144:
$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/67$, $u \in \{0, 1, \ldots, 59\}$, and $v \in \{0,1\}$;

where:
$N_{ZC}^{RS}$ is the ZC sequence length equal to the largest prime number below the SRS sequence length;

the parameter u is called the sequence group number and the parameter v is called the number within the group;

parameters u and v jointly determine the sequence root q as the product of number of possible values of u and number of possible values of v.

7. The method of claim 1 further comprising generating roots for full length ZC sequences for each SRS sequence length according to:

if SRS sequence length is between 36-60:

$q=\lfloor \bar{q}+\frac{1}{2} \rfloor$ where $\bar{q}=N_{ZC}^{RS} \cdot (u+1)/31$ and $u \in \{0, 1, \ldots, 29\}$;

if SRS sequence length is between 72-120:

$-q=\lfloor \bar{q}+\frac{1}{2} \rfloor$ where $\bar{q}=N_{ZC}^{RS} \cdot (u+1)/71$, $u \in \{0, 1, \ldots, 59\}$;

if SRS sequence length is larger or equal to 144:

$-q=\lfloor \bar{q}+\frac{1}{2} \rfloor$ where $\bar{q}=N_{ZC}^{RS} \cdot (u+1)/139$, $u \in \{0, 1, \ldots, 119\}$;

where:

$N_{ZC}^{RS}$ is the ZC sequence length equal to the largest prime number below the SRS sequence length;

the parameter u is called the sequence group number and root q is determined by u.

8. The method of claim 1 further comprising:
configuring a UE to use a truncated ZC sequence for sounding reference signal transmission;
performing a bandwidth allocation for reference signal transmission based on tree-like bandwidth allocation structures.

9. The method of claim 8 wherein performing a bandwidth allocation for reference signal transmission based on tree-like bandwidth allocation structures comprises using multiple tree-like bandwidth allocation structures simultaneously in one bandwidth part.

10. The method of claim 8, wherein a tree structure of the tree has a number of levels that each feature bandwidth allocation to a finer granularity, a SRS frequency hopping takes place in the tree levels above the tree level of the UE, the tree level in which the SRS frequency hopping occurs is determined by a UE-specific parameter SRS-hopping bandwidth, wherein the SRS is transmitted using a frequency band that changes location on a per slot basis within the bandwidth allocation during respective time slots.

11. The base station of claim 8, wherein a tree structure of the tree has a number of levels that each feature bandwidth allocation to a finer granularity, a SRS frequency hopping takes place in the tree levels above the tree level of the UE, the tree level in which the SRS frequency hopping occurs is determined by a UE-specific parameter SRS-hopping bandwidth, wherein the SRS is transmitted using a frequency band that changes location on a per slot basis within the bandwidth allocation during respective time slots.

12. The method of claim 1 further comprising:
configuring a UE to use a truncated ZC sequence for sounding reference signal transmission;
performing a bandwidth allocation for reference signal transmission that is not based on a tree-like bandwidth allocation structure, and using higher layer signalling to indicate a bandwidth allocation.

13. The method of claim 1 further comprising performing bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

14. The method of claim 1, further comprising performing a bandwidth allocation for sounding reference signaling (SRS) transmission using truncated ZC sequences, wherein SRS frequency hopping is combined with SRS antenna switching, the SRS frequency hopping takes place at a symbol-level, and SRS antenna switching takes place at a slot-level.

15. A method in a user equipment (UE) comprising:
receiving signalling to configure the UE of a plurality of UEs with a UE specific root to use in generating a Zadoff Chu (ZC) sequence for reference signal transmission, the UE specific root being different than the UE specific root for at least one other UE of the plurality of UEs, the UE specific root for each UE of the plurality of UEs being selected from a set of roots wherein the size of the set of roots is a function of ZC sequence length, and for at least one ZC sequence length, the size of the set of roots is greater than 60;
transmitting a reference signal in accordance with the generated ZC sequence.

16. The method of claim 15 wherein the UE specific root for each of plurality of the UEs is selected from a set of roots containing greater than 60 roots.

17. The method of claim 16 wherein the size of the set of roots is in accordance with:

| Sequence length | Number of roots |
| --- | --- |
| 36 to 60 | 30 |
| 72 to L1 | 60 |
| L2 to L3 | F2(L2) |
| ... | ... |
| Ln(n−1) to Ln | Fn(L(n−1)) | where the function Fn(Ln) value is not larger than the available number of roots for a sequence length Ln.

18. The method of claim 16 wherein the size of the set of roots is in accordance with:

| | ZC length | | |
| --- | --- | --- | --- |
| | 36-60 | 72-120 | 144 and above |
| Max #Roots | 30 | 60 | 120. |

19. The method of claim 16 wherein the set of roots containing greater than 60 roots comprises roots roughly uniformly placed over a ZC sequence length without sequence hopping.

20. The method of claim 15 wherein roots for full length ZC sequences for each SRS sequence length are according to:

if SRS sequence length is between 36-60:

$q=\lfloor \bar{q}+\frac{1}{2} \rfloor$ where $\bar{q}=N_{ZC}^{RS} \cdot (u+1)/31$ and $u \in \{0, 1, \ldots, 29\}$;

if SRS sequence length is between 72-120:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0, 1, \ldots, 29\}$, and $v \in \{0,1\}$;

if SRS sequence length is larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0, 1, \ldots, 29\}$; OR if SRS sequence length is larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/67$, $u \in \{0, 1, \ldots, 59\}$, and $v \in \{0,1\}$;

where:
- $N_{ZC}^{RS}$ is the ZC sequence length equal to the largest prime number below the SRS sequence length;
- the parameter u is called the sequence group number and the parameter v is called the number within the group;
- parameters u and v jointly determine the sequence root q as the product of number of possible values of u and number of possible values of v.

21. The method of claim 15 wherein roots for full length ZC sequences for each SRS sequence length are according to:

if SRS sequence length is between 36-60:

$-q = \lfloor \bar{q} + \frac{1}{2} \rfloor$ where $\bar{q} = N_{ZC}^{RS} \cdot (u+1)/31$ and $u \in \{0, 1, \ldots, 29\}$;

if SRS sequence length is between 72-120:

$-q = \lfloor \bar{q} + \frac{1}{2} \rfloor$ where $\bar{q} = N_{ZC}^{RS} \cdot (u+1)/71$, $u \in \{0, 1, \ldots, 59\}$;

if SRS sequence length is larger or equal to 144:

$-q = \lfloor \bar{q} + \frac{1}{2} \rfloor$ where $\bar{q} = N_{ZC}^{RS} \cdot (u+1)/139$, $u \in \{0, 1, \ldots, 119\}$;

where:
- $N_{ZC}^{RS}$ is the ZC sequence length equal to the largest prime number below the SRS sequence length;
- the parameter u is called the sequence group number and root q is determined by u.

22. The method of claim 15 further comprising:
receiving signaling to configure the UE to use a truncated ZC sequence for sounding reference signal transmission;
receiving signaling of a bandwidth allocation for reference signal transmission based on tree-like bandwidth allocation structures.

23. The method of claim 22 wherein the bandwidth allocation for reference signal transmission based on tree-like bandwidth allocation structures uses multiple tree-like bandwidth allocation structures simultaneously in one bandwidth part.

24. The method of claim 22, wherein a tree structure of the tree has a number of levels that each feature bandwidth allocation to a finer granularity, a SRS frequency hopping takes place in the tree levels above the tree level of the UE, the tree level in which the SRS frequency hopping occurs is determined by a UE-specific parameter SRS-hopping bandwidth, wherein the SRS is transmitted using a frequency band that changes location on a per slot basis within the bandwidth allocation during respective time slots.

25. The method of claim 15 further comprising:
receiving signaling to configure the UE to use a truncated ZC sequence for sounding reference signal transmission;
receiving higher signalling of a bandwidth allocation for reference signal transmission that is not based on a tree-like bandwidth allocation structure.

26. The method of claim 15 further comprising receiving signalling of a bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

27. The method of claim 15, wherein a bandwidth allocation for sounding reference signaling (SRS) transmission is generated using truncated ZC sequences, wherein SRS frequency hopping is combined with SRS antenna switching, the SRS frequency hopping takes place at a symbol-level, and SRS antenna switching takes place at a slot-level.

28. A base station comprising:
a processor, memory, transmitter and receiver;
the base station configured to transmit signalling to a plurality of user equipments (UEs) to configure each of a plurality of the UEs with a UE specific root to use in generating a Zadoff Chu (ZC) sequence for reference signal transmission, the UE specific root for each UE of the plurality of UEs being different than the UE specific root for at least one other UE of the plurality of UEs, the UE specific root for each UE of the plurality of UEs being selected from a set of roots wherein the size of the set of roots is a function of ZC sequence length, and for at least one ZC sequence length, the size of the set of roots is greater than 60; and to receive a respective reference signal from at least one of the plurality of UEs, the respective reference signal based on a ZC sequence generated using the UE specific root for that UE.

29. The base station of claim 28 further configured to select the UE specific root for each of plurality of the UEs from a set of roots containing greater than 60 roots.

30. The base station of claim 29 wherein the set of roots containing greater than 60 roots comprises roots roughly uniformly placed over a ZC sequence length without sequence hopping.

31. The base station of claim 28 wherein the size of the set of roots is in accordance with:

| Sequence length | Number of roots |
| --- | --- |
| 36 to 60 | 30 |
| 72 to $L_1$ | 60 |
| $L_2$ to $L_3$ | $F_2(L_2)$ |
| ... | ... |
| $L_{n-1}$ to $L_n$ | $F_{n-1}(L_{n-1})$ | where the function $F_n(L_n)$ value is not larger than the available number of roots for a sequence length $L_n$.

32. The base station of claim 28 wherein the size of the set of roots is in accordance with:

| | ZC length | | |
| --- | --- | --- | --- |
| | 36-60 | 72-120 | 144 and above |
| Max #Roots | 30 | 60 | 120. |

33. The base station of claim 28 further configured to generate roots for full length ZC sequences for each SRS sequence length according to:

if SRS sequence length is between 36-60:

$q = \lfloor \bar{q} + \frac{1}{2} \rfloor$ where $\bar{q} = N_{ZC}^{RS} \cdot (u+1)/31$ and $u \in \{0, 1, \ldots, 29\}$;

if SRS sequence length is between 72-120:

$q = \lfloor \bar{q} + \frac{1}{2} \rfloor + v \cdot (-1)^{\lfloor 2\bar{q} \rfloor}$ where $\bar{q} = N_{ZC}^{RS} \cdot (u+1)/31$, $u \in \{0, 1, \ldots, 29\}$, and $v \in \{0,1\}$;

if SRS sequence length is larger or equal to 144:

$q = \lfloor \bar{q} + \frac{1}{2} \rfloor + v \cdot (-1)^{\lfloor 2\bar{q} \rfloor}$ where $\bar{q} = N_{ZC}^{RS} \cdot (u+1)/31$, $u \in \{0, 1, \ldots, 29\}$; OR if SRS sequence length is larger or equal to 144:

$q = \lfloor \bar{q} + \frac{1}{2} \rfloor + v \cdot (-1)^{\lfloor 2\bar{q} \rfloor}$ where $\bar{q} = N_{ZC}^{RS} \cdot (u+1)/67$, $u \in \{0, 1, \ldots, 59\}$, and $v \in \{0,1\}$;

where:
- $N_{ZC}^{RS}$ is the ZC sequence length equal to the largest prime number below the SRS sequence length;
- the parameter u is called the sequence group number and the parameter v is called the number within the group;
- parameters u and v jointly determine the sequence root q as the product of number of possible values of u and number of possible values of v.

34. The base station of claim 28 further configured to generate roots for full length ZC sequences for each SRS sequence length according to:
if SRS sequence length is between 36-60:

$-q=\lfloor \bar{q}+\frac{1}{2} \rfloor$ where $\bar{q}=N_{ZC}^{RS} \cdot (u+1)/31$ and $u \in \{0, 1, \ldots, 29\}$;

if SRS sequence length is between 72-120:

$-q=\lfloor \bar{q}+\frac{1}{2} \rfloor$ where $\bar{q}=N_{ZC}^{RS} \cdot (u+1)/71$, $u \in \{0, 1, \ldots, 59\}$;

if SRS sequence length is larger or equal to 144:

$-q=\lfloor \bar{q}+\frac{1}{2} \rfloor$ where $\bar{q}=N_{ZC}^{RS} \cdot (u+1)/139$, $u \in \{0, 1, \ldots, 119\}$;

where:
- $N_{ZC}^{RS}$ is the ZC sequence length equal to the largest prime number below the SRS sequence length;
- the parameter u is called the sequence group number and root q is determined by u.

35. The base station of claim 28 further configured to:
- configure a UE to use a truncated ZC sequence for sounding reference signal transmission;
- perform a bandwidth allocation for reference signal transmission based on tree-like bandwidth allocation structures.

36. The base station of claim 35 configured to perform a bandwidth allocation for reference signal transmission based on tree-like bandwidth allocation structures by using multiple tree-like bandwidth allocation structures simultaneously in one bandwidth part.

37. The base station of claim 35 further configured to perform a bandwidth allocation for sounding reference signaling (SRS) transmission using truncated ZC sequences, wherein SRS frequency hopping is combined with SRS antenna switching, the SRS frequency hopping takes place at a symbol-level, and SRS antenna switching takes place at a slot-level.

38. The base station of claim 28 further configured:
- configure a UE to use a truncated ZC sequence for sounding reference signal transmission;
- perform a bandwidth allocation for reference signal transmission that is not based on a tree-like bandwidth allocation structure, and use higher layer signalling to indicate a bandwidth allocation.

39. The base station of claim 28 further configured to perform bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

40. A user equipment (UE) comprising:
- a processor, memory, transmitter and receiver;
- the UE configured to receive signalling to configure the UE with a UE specific root to use in generating a Zadoff Chu (ZC) sequence for reference signal transmission, the UE specific root being different than the UE specific root for at least one other UE of a plurality of UEs, the UE specific root for each UE of the plurality of UEs being selected from a set of roots wherein the size of the set of roots is a function of ZC sequence length, and for at least one ZC sequence length, the size of the set of roots is greater than 60 and to transmit a reference signal in accordance with the generated ZC sequence.

41. The UE of claim 40 wherein the UE specific root for each of plurality of the UEs is selected from a set of roots containing greater than 60 roots.

42. The UE of claim 41 wherein the set of roots containing greater than 60 roots comprises roots roughly uniformly placed over a ZC sequence length without sequence hopping.

43. The UE of claim 40 wherein the size of the set of roots is in accordance with:

| Sequence length | Number of roots |
| --- | --- |
| 36 to 60 | 30 |
| 72 to L1 | 60 |
| L2 to L3 | F2(L2) |
| ... | ... |
| Ln(n-1) to Ln | Fn(L(n-1)) | where the function Fn(Ln) value is not larger than the available number of roots for a sequence length Ln.

44. The UE of claim 40 wherein the size of the set of roots is in accordance with:

| | ZC length | | |
| --- | --- | --- | --- |
| | 36-60 | 72-120 | 144 and above |
| Max #Roots | 30 | 60 | 120. |

45. The UE of claim 40 wherein roots for full length ZC sequences for each SRS sequence length are according to:
if SRS sequence length is between 36-60:

$q=\lfloor \bar{q}+\frac{1}{2} \rfloor$ where $\bar{q}=N_{ZC}^{RS} \cdot (u+1)/31$ and $u \in \{0, 1, \ldots, 29\}$;

if SRS sequence length is between 72-120:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0, 1, \ldots, 29\}$, and $v \in \{0,1\}$;

if SRS sequence length is larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/31$, $u \in \{0, 1, \ldots, 29\}$; OR if SRS sequence length is larger or equal to 144:

$q=\lfloor \bar{q}+\frac{1}{2} \rfloor + v \cdot (-1)^{\lfloor 2\bar{q} \rfloor}$ where $\bar{q}=N_{ZC}^{RS} \cdot (u+1)/67$, $u \in \{0, 1, \ldots, 59\}$, and $v \in \{0,1\}$;

where:
- $N_{ZC}^{RS}$ is the ZC sequence length equal to the largest prime number below the SRS sequence length;
- the parameter u is called the sequence group number and the parameter v is called the number within the group;
- parameters u and v jointly determine the sequence root q as the product of number of possible values of u and number of possible values of v.

46. The UE of claim 40 wherein roots for full length ZC sequences for each SRS sequence length are according to:
if SRS sequence length is between 36-60:

$-q=\lfloor \bar{q}+\frac{1}{2} \rfloor$ where $\bar{q}=N_{ZC}^{RS} \cdot (u+1)/31$ and $u \in \{0, 1, \ldots, 29\}$;

if SRS sequence length is between 72-120:

$-q = \lfloor \bar{q} + \frac{1}{2} \rfloor$ where $\bar{q} = N_{ZC}^{RS} \cdot (u+1)/71$, $u \in \{0, 1, \ldots, 59\}$;

if SRS sequence length is larger or equal to 144:

$-q = \lfloor \bar{q} + \frac{1}{2} \rfloor$ where $\bar{q} = N_{ZC}^{RS} \cdot (u+1)/139$, $u \in \{0, 1, \ldots, 119\}$;

where:

$N_{ZC}^{RS}$ is the ZC sequence length equal to the largest prime number below the SRS sequence length;

the parameter u is called the sequence group number and root q is determined by u.

47. The UE of claim 40 further configured to:

receive signaling to configure the UE to use a truncated ZC sequence for sounding reference signal transmission;

receive signaling of a bandwidth allocation for reference signal transmission based on tree-like bandwidth allocation structures.

48. The UE of claim 47 wherein the bandwidth allocation for reference signal transmission based on tree-like bandwidth allocation structures uses multiple tree-like bandwidth allocation structures simultaneously in one bandwidth part.

49. The UE of claim 47, wherein a tree structure of the tree has a number of levels that each feature bandwidth allocation to a finer granularity, a SRS frequency hopping takes place in the tree levels above the tree level of the UE, the tree level in which the SRS frequency hopping occurs is determined by a UE-specific parameter SRS-hopping bandwidth, wherein the SRS is transmitted using a frequency band that changes location on a per slot basis within the bandwidth allocation during respective time slots.

50. The UE of claim 40 further configured to:

receive signaling to configure the UE to use a truncated ZC sequence for sounding reference signal transmission;

receive higher signalling of a bandwidth allocation for reference signal transmission that is not based on a tree-like bandwidth allocation structure.

51. The UE of claim 40 further configured to receive signalling of a bandwidth allocation for sounding reference signal transmission using truncated ZC sequences with one or multiple tree like bandwidth allocation structures or with non-tree like bandwidth allocation structures, subject to a constraint on overlapped bandwidth to ensure orthogonality.

52. The UE of claim 40, wherein a bandwidth allocation for sounding reference signaling (SRS) transmission is generated using truncated ZC sequences, wherein SRS frequency hopping is combined with SRS antenna switching, the SRS frequency hopping takes place at a symbol-level, and SRS antenna switching takes place at a slot-level.

* * * * *